(12) United States Patent
Seok et al.

(10) Patent No.: US 11,604,485 B2
(45) Date of Patent: *Mar. 14, 2023

(54) MULTIPLE POWER MANAGEMENT INTEGRATED CIRCUITS AND APPARATUS HAVING DUAL PIN INTERFACE

(71) Applicant: Samsung Electronics Co., Ltd., Suwon-si (KR)

(72) Inventors: Minshik Seok, Hwaseong-si (KR); Younghoon Lee, Seoul (KR); Kyungrae Kim, Seongnam-si (KR); Kyungsoo Lee, Yongin-si (KR); Junho Huh, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,907

(22) Filed: Feb. 7, 2022

(65) Prior Publication Data

US 2022/0155807 A1 May 19, 2022

Related U.S. Application Data

(63) Continuation of application No. 17/027,946, filed on Sep. 22, 2020, now Pat. No. 11,275,394.

(30) Foreign Application Priority Data

Mar. 2, 2020 (KR) .......................... 10-2020-0026129

(51) Int. Cl.
*G05F 1/56* (2006.01)
*G06F 1/26* (2006.01)

(52) U.S. Cl.
CPC . *G05F 1/56* (2013.01); *G06F 1/26* (2013.01)

(58) Field of Classification Search
None
See application file for complete search history.

(56) References Cited

U.S. PATENT DOCUMENTS 7,793,005 B1 9/2010 Fernald et al.
8,448,001 B1 5/2013 Zhu et al.
(Continued)

FOREIGN PATENT DOCUMENTS

KR 101861743 B1 5/2018

OTHER PUBLICATIONS

Notice of Allowance dated Nov. 5, 2021, issued in corresponding U.S. Appl. No. 17/027,946.

*Primary Examiner* — Thomas J. Hiltunen
(74) *Attorney, Agent, or Firm* — Harness, Dickey & Pierce, P.L.C.

(57) ABSTRACT

Multiple power management integrated circuits (PMICs) may perform communication and power sequence operation coordination between the multiple PMICs through a communication interface connected to two signal lines using a dual pin interface. The multiple PMICs include a main PMIC configured to communicate with at least one application processor through a system interface and at least one sub-PMIC configured to communicate with the main PMIC through the communication interface. A first signal line uses a single bidirectional signaling scheme, and a power status signal PSTATUS is exchanged between the main PMIC and the at least one sub-PMIC through the first signal line. A second signal line uses a single unidirectional signaling scheme, and a power sequence control signal PIF is transmitted from the main PMIC to the at least one sub-PMIC through the second signal line.

11 Claims, 15 Drawing Sheets

(56) References Cited

U.S. PATENT DOCUMENTS

| | | |
|---|---|---|
| 8,627,119 B2 | 1/2014 | Barnes et al. |
| 8,850,247 B2 | 9/2014 | Han et al. |
| 9,841,805 B2 | 12/2017 | Shimada |
| 9,880,596 B2 | 1/2018 | Cheng et al. |
| 10,819,238 B1 | 10/2020 | King et al. |
| 10,877,541 B1 * | 12/2020 | Benjamin ............. G06F 1/3203 |
| 11,054,878 B2 | 7/2021 | Wang et al. |
| 11,275,394 B2 * | 3/2022 | Seok ......................... G06F 1/26 |
| 2019/0064910 A1 | 2/2019 | Wang et al. |

* cited by examiner

FIG. 12A PIF 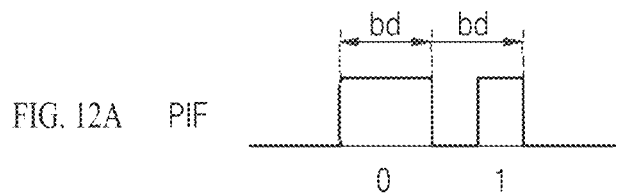
FIG. 12B PIF 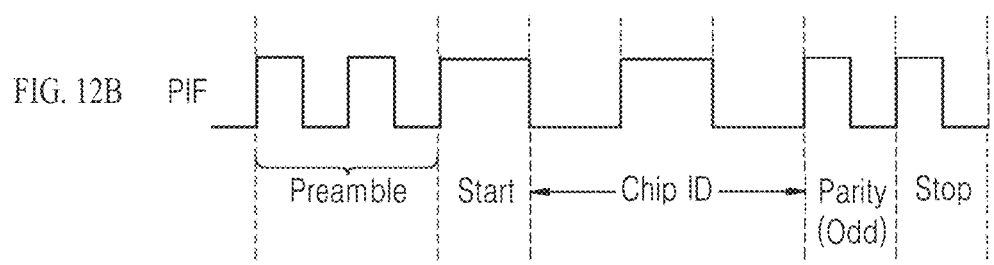
FIG. 12C PIF 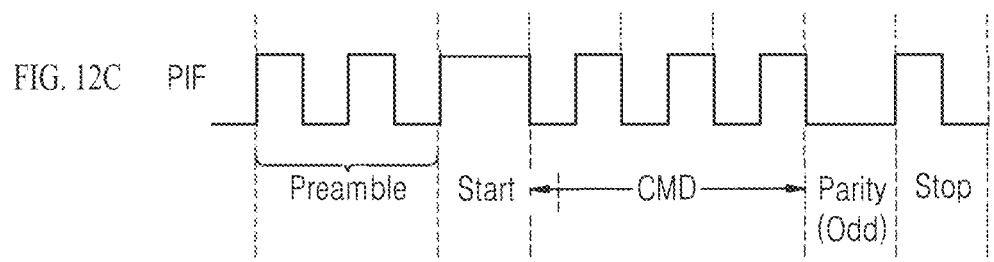
FIG. 12D PIF 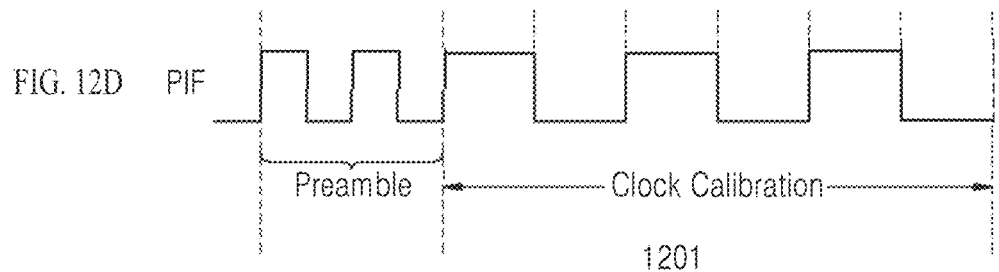
FIG. 12E PIF 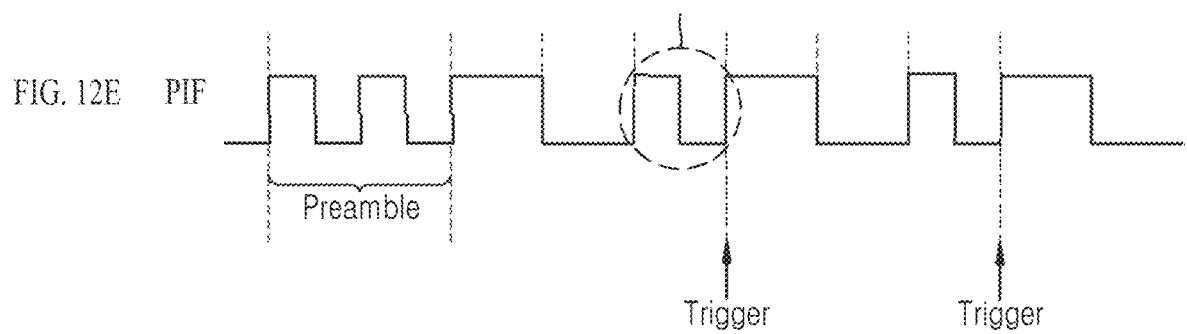

MULTIPLE POWER MANAGEMENT INTEGRATED CIRCUITS AND APPARATUS HAVING DUAL PIN INTERFACE

CROSS-REFERENCE TO RELATED APPLICATION

This is a continuation of U.S. application Ser. No. 17/027,946, filed Sep. 22, 2020, which claims priority to Korean Application No. 10-2020-0026129, filed on Mar. 2, 2020, the disclosures of each of which are hereby incorporated by reference in their entirety.

BACKGROUND

Various example embodiments of the inventive concepts relate to power control, and more particularly, to power management integrated circuit (PMIC) systems, methods, and apparatuses for inter-device signaling by using an interface implemented by dual pins.

A system on chip (SoC) indicates a technology of integrating various functional blocks such as a central processing unit (CPU), a memory, a digital signal processing circuit, and/or an analog signal processing circuit, into one semiconductor integrated circuit or one integrated circuit integrated according to the technology. An SoC is developed to a further complex system including a processor, multimedia, graphics, security, and the like. An SoC embedded in mobile devices, such as smartphones and tablet PCs, etc., includes a PMIC in response to an increase in demand for the power necessary for various functions of the mobile device, as well as for efficient power management. The PMIC performs a power conversion function and a power sequence function for outputting various output voltages to voltage rails.

When circuits in the PMIC are too large, an increased physical footprint size may cause a high operation cost due to reasons such as, circuit layout challenges, external component placement congestion, thermal density challenges, and/or increased complexity of the PMIC design, etc. When reaching a PMIC physical size limit, an SoC may employ multiple PMICs. The multiple PMICs may disperse the thermal load and allow external components to be easily placed.

However, the demand for a plurality of board-level connection parts (or pins) for communication and operation coordination between the multiple PMICs may exist. The plurality of board-level connection parts may cause SoC board-level routing congestion. Accordingly, pin count reduction for improving and/or optimizing a physical area, an operating cost, and routing of the PMIC and/or SoC is demanded.

SUMMARY

Various example embodiments of the inventive concepts provide power management integrated circuit (PMIC) systems, methods, and/or apparatuses for inter-device signaling by using a communication interface implemented by dual pins.

According to at least one example embodiment of the inventive concepts, there is provided a power management integrated circuit (PMIC) system including a main PMIC; and at least one sub-PMIC configured to communicate with the main PMIC through a first signal line and a second signal line, the first signal line using a single bidirectional signaling scheme, and the second signal line using a single unidirectional signaling scheme, the main PMIC configured to transmit a power status signal to the at least one sub-PMIC on the first signal line, the at least one sub-PMIC further configured to perform an operation associated with power state information and a power sequence based on the power status signal, and the main PMIC is further configured to control the power sequence of the at least one sub-PMIC using a power sequence control signal transmitted to the at least one sub-PMIC on the second signal line.

According to at least one example embodiment of the inventive concepts, there is provided a method of signaling between multiple power management integrated circuits (PMICs), the method including: coupling a main PMIC and at least one sub-PMIC to each other through a first bidirectional line; coupling the main PMIC to the at least one sub-PMIC to each other through a second unidirectional line; asserting an operation associated with a power sequence of the main PMIC and the at least one sub-PMIC based on a power status signal on the single bidirectional line from the main PMIC and the at least one sub-PMIC; and asserting an operation of controlling a power sequence of the at least one sub-PMIC by using a power sequence control signal on the single unidirectional line from the main PMIC to the at least one sub-PMIC.

According to at least one example embodiment of the inventive concepts, there is provided an apparatus for signaling between a plurality of power management integrated circuits (PMICs), the apparatus including: at least one application processor including a plurality of power domains; and the plurality of PMICs configured to generate a plurality of output voltages in association with a power sequence of the plurality of power domains, and provide the plurality of output voltages to the plurality of power domains through voltage rails, the plurality of PMICs including a main PMIC configured to communicate with the at least one application processor through a system interface, at least one sub-PMIC configured to communicate with the main PMIC through a communication interface connected to a first signal line and a second signal line, the first signal line using a single bidirectional signaling scheme, and the second signal line using a single unidirectional signaling scheme, the main PMIC is further configured to exchange power state information and a power status signal with the at least one sub-PMIC on the first signal line, the at least one sub-PMIC is further configured to perform an operation associated with the power state information and a power sequence based on the power state information, and the main PMIC is further configured to control a power sequence of the at least one sub-PMIC based on a power sequence control signal transmitted to the at least one sub-PMIC on the second signal line.

BRIEF DESCRIPTION OF THE DRAWINGS

Various example embodiments of the inventive concepts will be more clearly understood from the following detailed description taken in conjunction with the accompanying drawings in which:

FIGS. 12A to 12E are diagrams of inter-device signaling in a PMIC system, according to some example embodiments of the inventive concepts;

DETAILED DESCRIPTION

Figure 1:
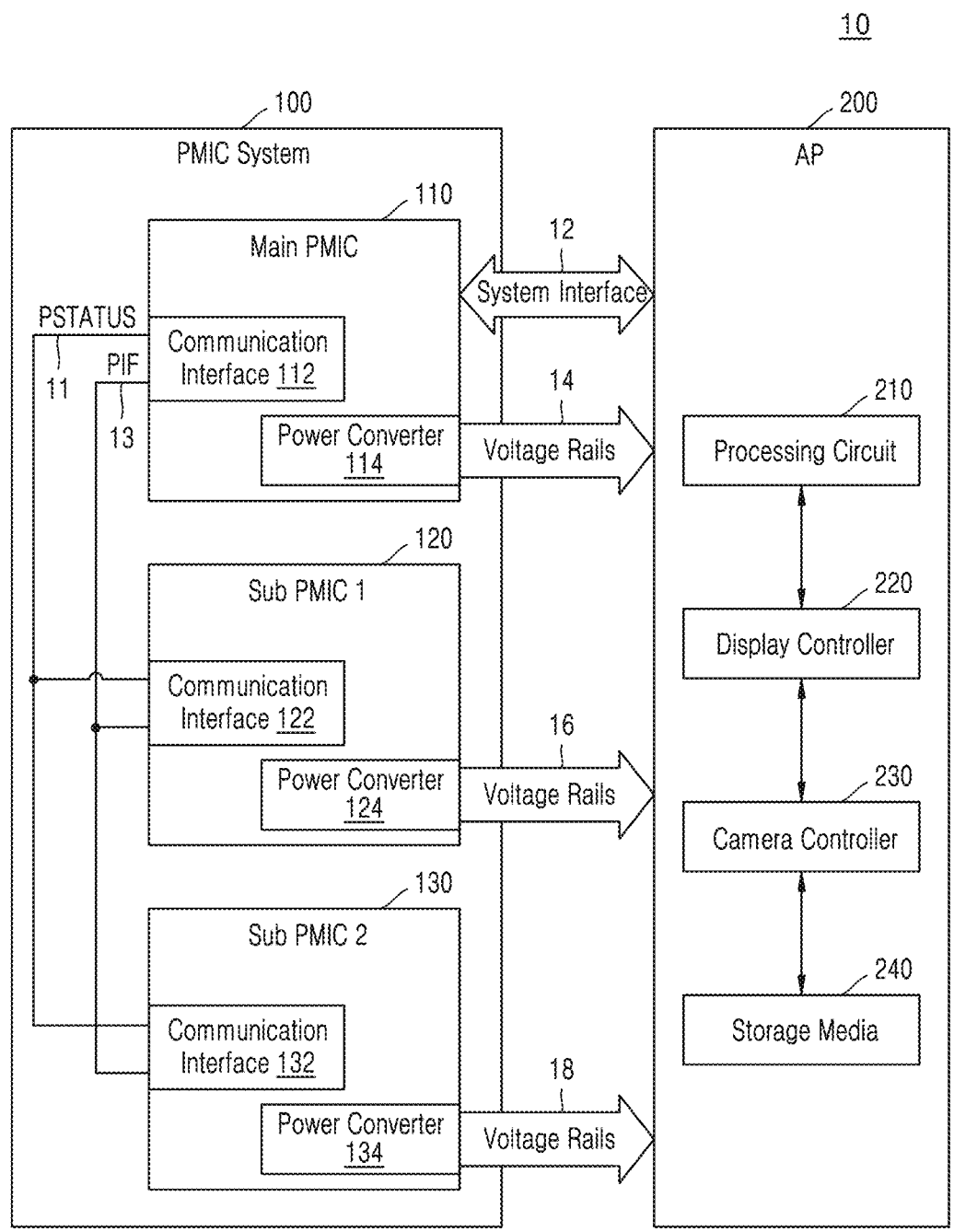
FIG. 1 is a block diagram of an apparatus using a communication interface in which inter-device signaling is implemented by dual pins through which two signals are provided, according to at least one example embodiment of the inventive concepts.

FIG. 1 is a block diagram of an apparatus 10 using a communication interface in which inter-device signaling is implemented by dual pins through which two signals are provided, according to at least one example embodiment of the inventive concepts.

Referring to FIG. 1, the apparatus 10 may be implemented by a system on chip (SoC) including a power management integrated circuit (PMIC) system 100 and/or at least one application processor (hereinafter, referred to as "AP") 200 configured to control an operation of the apparatus 10, etc., but the example embodiments are not limited thereto, and the SoC may include a greater or lesser number of constituent components, such as additional PMICs, additional processors, at least one bus, etc. The apparatus 10 may be an electronic device, such as a wireless mobile device, a mobile telephone, a mobile computing system, a laptop computer, a tablet computing device, a media player, a gaming device, a smart device, an Internet of Things device, a virtual reality and/or augmented reality device, a television, an appliance, a vehicle, or the like. The apparatus 10 may include a wireless communication device configured to communicate with a radio access network, a core access network, the Internet and/or other networks through a radio frequency (RF) transceiver, an infrared (IR) receiver, etc. The AP 200 may be connected and communicate with the PMIC system 100 through a system interface 12 and/or voltage rails 14, 16, and 18, but is not limited thereto.

Some examples may be described by using the expressions "connected" and/or "coupled" together with the derivatives thereof. These terms are not necessarily intended as synonyms for each other. For example, a description using the terms "connected" and/or "coupled" may indicate that two or more elements are in physical or electrical contact with each other. In addition, the terms "connection" and/or "coupling" may also indicate that two or more elements are not in direct contact with each other but still cooperate or interact with each other.

The AP 200 may include a one or more integrated processors (IPs) driven using various power domains, e.g., a processing circuit 210, a display controller 220, a camera controller 230, and/or storage media 240, etc. An IP may be a circuit, a logic, and/or a combination thereof, which may be integrated in an SoC. Additionally, in at least one example embodiment, the processing circuit 210, display controller 220, camera controller 230, storage media 240, etc., may be combined into one or more components and/or modules of the AP 200. The AP 200 may access and execute software applications using the processing circuit 210, control logic circuitry (not shown), timing logic circuitry (not shown), and/or other devices. The AP 200 may support a user interface configured to manage or operate the display controller 220 and control an operation of a camera or a video input device by using the camera controller 230, etc. The display controller 220 may include circuits and software drivers supporting displays such as a liquid crystal display (LCD) panel, a touchscreen display, and/or an indicator, etc. According to some example embodiments, the AP 200 may be any processing circuitry capable of performing the functionality of one or more of the processing circuit 210, display controller 220, and/or camera controller 230, etc. The processing circuitry may include hardware, such as processors, processor cores, logic circuits, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), etc. The storage media 240 may include transitory and/or non-transitory storage devices configured to maintain commands and data to be used for components of a device controlled by the processing circuit 210 and/or the AP 200, etc.

The PMIC system 100 may include multiple PMICs. The PMIC system 100 may include a main PMIC 110 and one or more sub-PMICs, e.g., a first sub-PMIC 120 and a second sub-PMIC 130, etc., but is not limited thereto. The system interface 12 may be connected between the main PMIC 110 and the AP 200, etc., and command, data, and/or control information may be exchanged through the system interface 12. The plurality of voltage rails 14, 16, and 18 may connect all of the PMICs, that is, the main PMIC 110, the first sub-PMIC 120, and the second sub-PMIC 130, etc., to the AP 200, but is not limited thereto.

The one or more PMICs, that is, the main PMIC 110, the first sub-PMIC 120, and the second sub-PMIC 130, etc., may include a plurality of communication interfaces 112, 122, and 132, respectively, but is not limited thereto, and for example a different number of communication interfaces may be used (e.g., a single communication interface, two communication interfaces, four communication interfaces, etc.). The plurality of communication interfaces 112, 122, and 132 may communicate with other PMICs, that is, the main PMIC 110, the first sub-PMIC 120, and the second sub-PMIC 130, through two signal (e.g., PSTATUS, PIF) lines. The PMICs, that is, the main PMIC 110, the first sub-PMIC 120, and the second sub-PMIC 130, may include a plurality of power converters 114, 124, and 134, respectively. The power converters 114, 124, and 134 may control the voltage rails 14, 16, and 18 respectively connected to the PMICs, that is, the main PMIC 110, the first sub-PMIC 120, and the second sub-PMIC 130, by using information provided through the communication interfaces 112, 122, and 132, so that a power source voltage is supplied, or blocked, (e.g., enabled and/or disabled) to or from all or partial number of the power domains of the AP 200 (e.g., the integrated processors of the AP 200, the storage media 240, etc.).

The two signal (e.g., PSTATUS, PIF) lines may include a first signal line 11 and a second signal line 13. According to at least one example embodiment, the first signal line 11 may perform communication using a single bidirectional signaling scheme, and the plurality of PMICs, for example, the main PMIC 110, the first sub-PMIC 120, and the second sub-PMIC 130, etc., may be coupled to each other through the first signal line 11, but the example embodiments are not limited thereto. An operation associated with power state information and a power sequence of the PMICs, that is, the main PMIC 110, the first sub-PMIC 120, and the second sub-PMIC 130, may be asserted by using a power status signal PSTATUS exchanged among the plurality of PMICs, for example, the main PMIC 110, the first sub-PMIC 120, and/or the second sub-PMIC 130, etc., but the example embodiments are not limited thereto. According to at least one example embodiment, the second signal line 13 may perform communication using a single unidirectional signaling scheme, and, e.g., the main PMIC 110 may be coupled to the first and second sub-PMICs 120 and 130 through the second signal line 13, but the example embodiments are not limited thereto. An operation of controlling a power sequence of the first and second sub-PMICs 120 and 130 may be asserted by using a power sequence control signal PIF transmitted from the main PMIC 110 to the first and second sub-PMICs 120 and 130, etc. Hereinafter, the first signal line 11 may be referred to as a power status signal (e.g., PSTATUS) line, and the second signal line 13 may referred to as a power sequence control signal (e.g., PIF) line.

Figure 2:
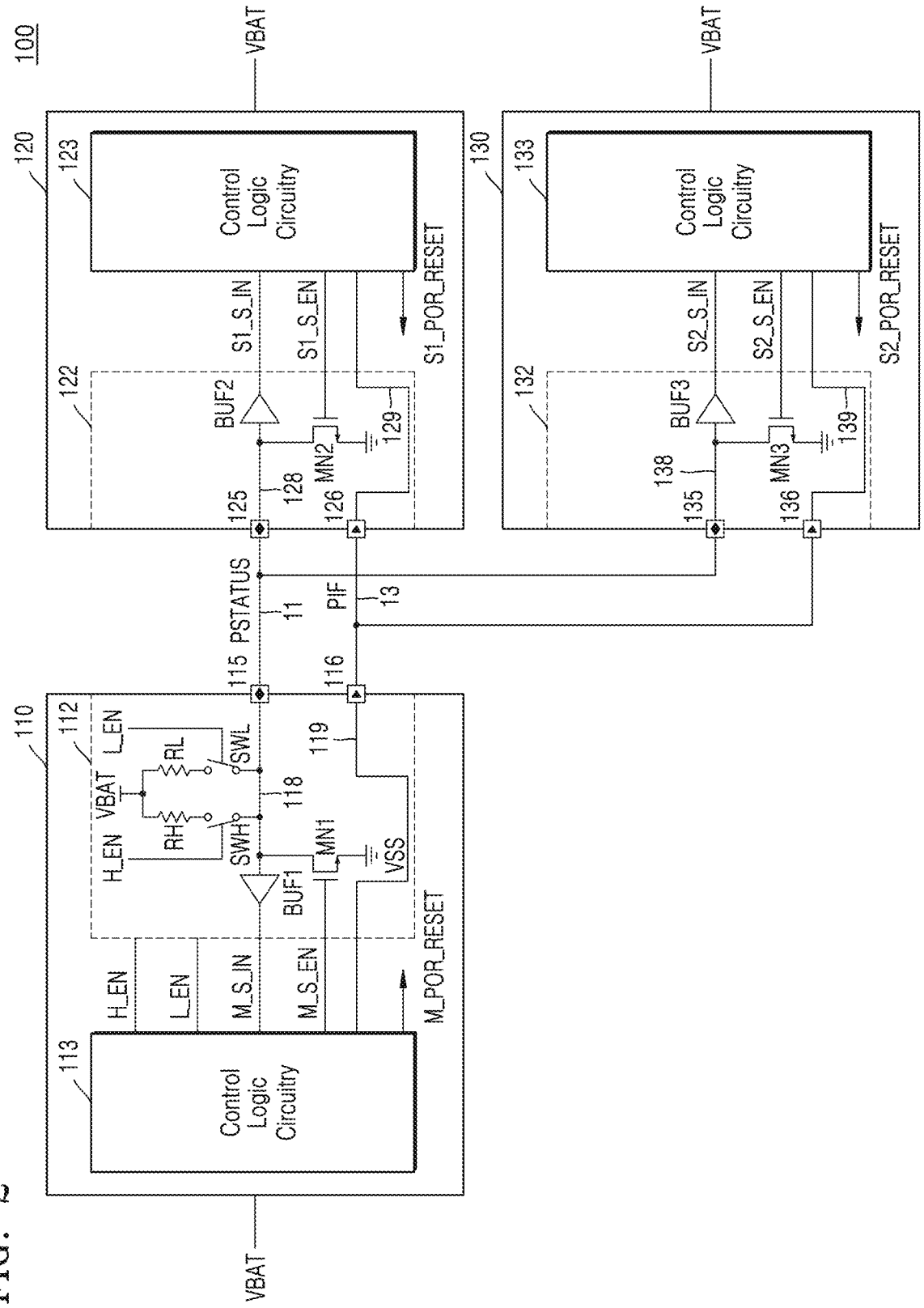
FIG. 2 is a block diagram of a power management integrated circuit (PMIC) system of FIG. 1 according to at least one example embodiment.

FIG. 2 is a block diagram of the PMIC system 100 of FIG. 1 according to at least one example embodiment. A structure of the plurality of communication interfaces, e.g., communication interfaces 112, 122, and 132, etc., respectively included in the main PMIC 110 and the first and second sub-PMICs 120 and 130 of the PMIC system 100 will be described in more detail with reference to FIG. 2, but the example embodiments are not limited thereto.

Referring to FIG. 2, in the PMIC system 100, the main PMIC 110 may communicate with one or more sub-PMICs, such as the first and second sub-PMICs 120 and 130, through the at least two signal (PSTATUS, PIF) lines, but is not limited thereto. For example, the main PMIC 110 and the first and second sub-PMICs 120 and 130 may operate by being connected to an external power source, for example, operate by being connected to battery power VBAT, but is not limited thereto.

The main PMIC 110 may include the communication interface 112 connected to the at least two signal (PSTATUS, PIF) lines, and a control logic 113 (e.g., control logic circuitry, etc.) configured to control the communication interface 112. According to some example embodiments, the control logic 113 may be any processing circuitry capable of controlling the communication interface 112, such as hardware, logic circuits, processors, processor cores, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), etc. The communication interface 112 may include at least a first pin 115 through which the power status signal PSTATUS is transmitted and/or received, and a second pin 116 through which the power sequence control signal PIF is transmitted, but the example embodiments are not limited thereto. For example, through the first pin 115, the power status signal PSTATUS output from the main PMIC 110 may be transmitted to the first and second sub-PMICs 120 and 130, and the power status signals PSTATUS output from the first and second sub-PMICs 120 and 130 may be received by the main PMIC 110, etc. The power status signal PSTATUS may be provided using a bidirectional signaling access scheme using a single wire, or in other words, the PSTATUS signal line may be a bidirectional signal line. Through the second pin 116, the power sequence control signal PIF output from the main PMIC 110 may be transmitted to the first and second sub-PMICs 120 and 130, etc. The power sequence control signal PIF may be provided using a single unidirectional signaling access scheme, or in other words, the PIF signal line may be a unidirectional signal line, and, for example, signaled by a bi-phase Manchester code scheme, but is not limited thereto.

According to some example embodiments of the inventive concepts, the power status signal PSTATUS is a signal for assertion and/or de-assertion of an operation including power state confirmation of all of the plurality of PMICs, e.g., the main PMIC 110, the first sub-PMIC 120, and the second sub-PMIC 130, etc., as well as the power ON/OFF of a total system, i.e., the apparatus 10, power sequence execution of the PMIC system 100, and the like. The power sequence control signal PIF is a signal for assertion and/or de-assertion of, for example, an operation including clock synchronization (and/or calibration) notification to the first and second sub-PMICs 120 and 130, power-off trigger point notification through frequency shift keying, identification (ID) check of the first and second sub-PMICs 120 and 130, power-on sequence notification of the first and second sub-PMICs 120 and 130, and the like.

The communication interface 112 of the main PMIC 110 may include, for example, a first resistor RH, a second resistor RL, a first switch SWH, a second switch SWL, an n-channel metal-oxide semiconductor (NMOS) transistor MN1, a buffer BUF1, and/or at least a first and second connection nodes 118 and 119 respectively connected to the at least first and second pins 115 and 116, but the example embodiments are not limited thereto, and a greater or lesser number of constituent components may be included in the communication interface 112. According to at least one example embodiment, the first resistor RH and the first switch SWH are connected in series between a battery power (VBAT) line and a first connection node (118) line, and the first switch SWH is turned on/off in response to a first enable signal H_EN, but the example embodiments are not limited thereto. The second resistor RL and the second switch SWL are connected in series between the battery power (VBAT) line and the first connection node (118) line, and the second switch SWL is turned on/off in response to a second enable signal L_EN, but the example embodiments are not limited thereto. The first resistor RH may be configured to have a larger (and/or significantly) larger resistance value than the second resistor RL, but is not limited thereto. The NMOS transistor MN1 is connected between the first connection node (118) line and a ground voltage (VSS) line, and a third enable signal M_S_EN is applied to a gate of the NMOS transistor MN1, but the example embodiments are not limited thereto. The buffer BUF1 has an input connected to the first connection node (118) line and an output, but is not limited thereto. An output of the buffer BUF1 is output as a state input signal M_S_IN. The first connection node (118) line may be connected to the first pin 115 through which the power status signal PSTATUS is transmitted and received and connected to the power status signal (PSTATUS) line. A second connection node (119) line may be connected to the second pin 116 through which the power sequence control signal PIF is transmitted and connected to the power sequence control signal (PIF) line.

The control logic circuitry 113 may generate the first to third enable signals H_EN, L_EN, and M_S_EN and the power sequence control signal PIF and provide the first to third enable signals H_EN, L_EN, and M_S_EN and the power sequence control signal PIF to the communication interface 112, according to an operational behavior of the PMIC system 100, but the example embodiments are not limited thereto. The control logic circuitry 113 may receive the state input signal M_S_IN output from the buffer BUF1 of the communication interface 112 and check power states of the one or more sub-PMICs, e.g., the first and second sub-PMICs 120 and 130, etc. The control logic circuitry 113 may generate a power on reset signal M_POR_RESET for resetting the main PMIC 110 for a normal operation of the main PMIC 110 when a voltage level of the battery power VBAT provided to the main PMIC 110 is stably and/or constantly maintained, etc. The control logic circuitry 113 may decode a command to be provided from the AP 200 through the system interface 12 and provide a control voltage (VCONI of FIG. 5) to at least one reference voltage generator (e.g., 411 of FIG. 5) according to an operation mode included in the command, but the example embodiments are not limited thereto.

The first sub-PMIC 120 may include a communication interface 122 connected to the at least two signal (e.g., PSTATUS, PIF) lines and a control logic circuitry 123 configured to control the communication interface 122. The communication interface 122 may include a first pin 125 through which the power status signal PSTATUS is transmitted and/or received and a second pin 126 through which the power sequence control signal PIF is received, etc. The communication interface 122 may include first and second connection node (128, 129) lines respectively connected to the first and second pins 125 and 126 and an NMOS transistor MN2 and a buffer BUF2 connected to a first connection node 128, but the example embodiments are not limited thereto. The NMOS transistor MN2 is connected between the first connection node (128) line and the ground voltage (VSS) line, and a state enable signal S1_S_EN is applied to a gate of the NMOS transistor MN2, but is not limited thereto. The state enable signal S1_S_EN is provided from the control logic circuitry 123 according to an operational behavior of the PMIC system 100, but the example embodiments are not limited thereto. An input of the buffer BUF2 is connected to the first connection node (128) line, and an output of the buffer BUF2 is provided to the control logic circuitry 123 as a state input signal S1_S_IN. The control logic circuitry 123 may generate a power on reset signal S1_POR_RESET for resetting the first sub-PMIC 120 for a normal operation of the first sub-PMIC 120 when the voltage level of the battery power VBAT provided to the first sub-PMIC 120 is stably and/or constantly maintained, etc.

The second sub-PMIC 130 may also include a communication interface 132 connected to the at least two signal (e.g., PSTATUS, PIF) lines and a control logic circuitry 133 configured to control the communication interface 132, but the example embodiments are not limited thereto. The communication interface 132 may include a first pin 135 through which the power status signal PSTATUS is transmitted and received and a second pin 136 through which the power sequence control signal PIF is received, but is not limited thereto. The communication interface 132 may include first and second connection node (138, 139) lines respectively connected to the first and second pins 125 and 126 and an NMOS transistor MN3 and a buffer BUF3 connected to a first connection node 138, but the example embodiments are not limited thereto. The NMOS transistor MN3 is connected between the first connection node (138) line and the ground voltage (VSS) line, and a state enable signal S2_S_EN is applied to a gate of the NMOS transistor MN3, but is not limited thereto. The state enable signal S2_S_EN is provided from the control logic circuitry 133 according to an operational behavior of the PMIC system 100. An input of the buffer BUF3 is connected to the first connection node (138) line, and an output of the buffer BUF3 is provided to the control logic circuitry 133 as a state input signal S2_S_IN, but the example embodiments are not limited thereto. The control logic circuitry 133 may generate a power on reset signal S2_POR_RESET for resetting the second sub-PMIC 130 for a normal operation of the second sub-PMIC 130 when the voltage level of the battery power VBAT provided to the second sub-PMIC 130 is stably and/or constantly maintained, etc.

Figure 3:
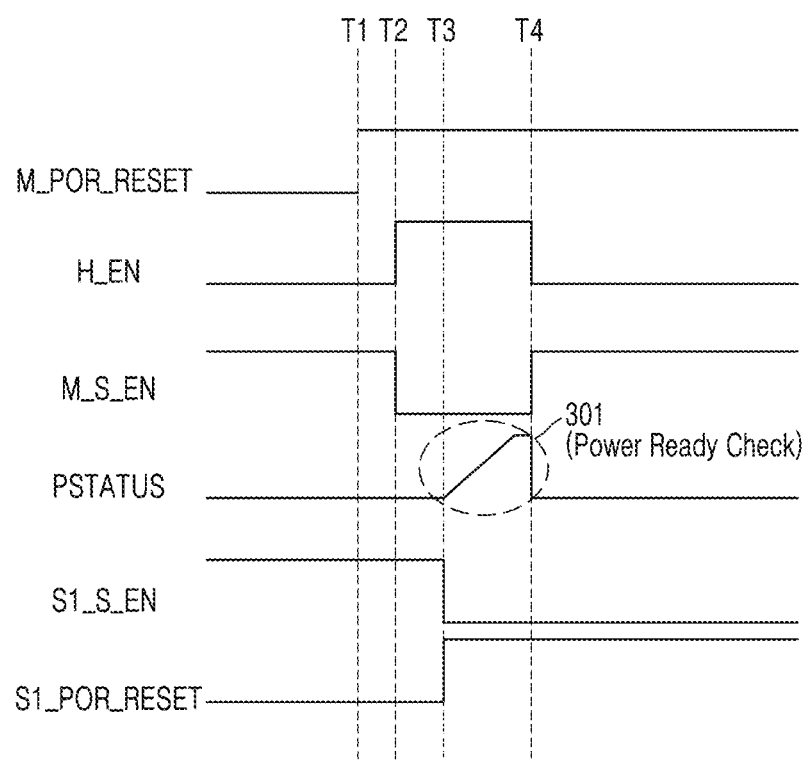
FIG. 3 is a diagram of a timing behavior of the PMIC system of FIG. 2 according to at least one example embodiment.

FIG. 3 is a diagram of a timing behavior of the PMIC system 100 of FIG. 2 according to at least one example embodiment. FIG. 3 shows a scheme by which the main PMIC 110, for example, checks a power ready state of the first sub-PMIC 120 between the first and second sub-PMICs 120 and 130, but the example embodiments are not limited thereto. The same scheme as described with reference to FIG. 3 may also be applied to a scheme by which the main PMIC 110 checks a power ready state of the second sub-PMIC 130, etc. Hereinafter, for the sake of convenience of description, an operational behavior between the first sub-PMIC 120 of the first and second sub-PMICs 120 and 130 and the main PMIC 110 will be mainly described, but the example embodiments are not limited thereto. It will be understood that the timing diagrams described in the example embodiments of the inventive concepts are not necessarily shown at and/or limited to a constant ratio.

Referring to FIGS. 2 and 3, before a time point T1, the NMOS transistor MN1 is turned on by the third enable signal M_S_EN of a logic high level in the main PMIC 110, and the NMOS transistor MN2 is turned on by the state enable signal S1_S_EN of the logic high level in the first sub-PMIC 120, and thus the power status signal PSTATUS has a logic low level, but the example embodiments are not limited thereto. The power status signal PSTATUS is de-asserted to the logic low level, but is not limited thereto.

At the time point T1, when the voltage level of the battery power VBAT provided to the main PMIC 110 is stably and/or constantly maintained (e.g., the voltage level received by the PMIC 110 is at a constant or near constant voltage level within a desired threshold voltage range, such as +/−10%, etc.), the main PMIC 110 may generate the power on reset signal M_POR_RESET of the logic high level. In this case, the main PMIC 110 may be in a reset mode.

At a time point T2, the main PMIC 110 may generate the first enable signal H_EN of the logic high level and the third enable signal M_S_EN of the logic low level. The first switch SWH is turned on by the first enable signal H_EN of the logic high level, and the NMOS transistor MN1 is turned off by the third enable signal M_S_EN of the logic low level.

At a time point T3, when the voltage level of the battery power VBAT provided to the first sub-PMIC 120 is stably and/or constantly maintained, the first sub-PMIC 120 may generate the power on reset signal S1_POR_RESET of the logic high level and the state enable signal S1_S_EN of the logic low level, but the example embodiments are not limited thereto. The NMOS transistor MN2 is turned off by the state enable signal S1_S_EN of the logic low level, but is not limited thereto. In addition, approximately at the time point T3, when the voltage level of the battery power VBAT provided to the second sub-PMIC 130 is stably and/or constantly maintained, the second sub-PMIC 130 may generate the power on reset signal S2_POR_RESET of the logic high level and the state enable signal S2_S_EN of the logic low level, thereby turning the NMOS transistor MN3 off. As an example, it is assumed that power states of all the PMICs, that is, the main PMIC 110, the first sub-PMIC 120, and the second sub-PMIC 130, are stable approximately at the time point T3, but the example embodiments are not limited thereto.

At the time point T3, in the main PMIC 110, power may be transmitted from the battery power VBAT to the first connection node (118) line through the first resistor RH and the first switch SWH by the first enable signal H_EN of the logic high level so that the first connection node (118) line goes to the logic high level.

At a time point T4, in the main PMIC 110, the logic high level on the first connection node (118) line may be outputted as the state input signal M_S_IN through the buffer BUF1 and provided to the control logic circuitry 113, but the example embodiments are not limited thereto. The control logic circuitry 113 may trigger the first enable signal H_EN to the logic low level and the third enable signal M_S_EN to the logic high level based on the state input signal M_S_IN of the logic high level, etc. Accordingly, on the first connection node (118) line, a pulse signal having a ramping leading edge and a trailing edge may be generated, but the example embodiments are not limited thereto. As an operation result by the main PMIC 110 and the first and second sub-PMICs 120 and 130, an interface level 301 is shown on the first connection node (e.g., 118, 128) lines and the power status signal (e.g., PSTATUS) line. The interface level 301 of the power status signal PSTATUS is observed by (and/or detected by, received by, etc.) the main PMIC 110 and the at least first and second sub-PMICs 120 and 130, etc., and may assert that the main PMIC 110 and the at least first and second sub-PMICs 120 and 130 are in a power ready state. Accordingly, the main PMIC 110 may check the power ready state of the PMIC system 100 by the interface level 301 of the power status signal PSTATUS. The main PMIC 110 may transmit the power ready state of the PMIC system 100 to the AP 200 through the system interface 12, but the example embodiments are not limited thereto.

Figure 4:
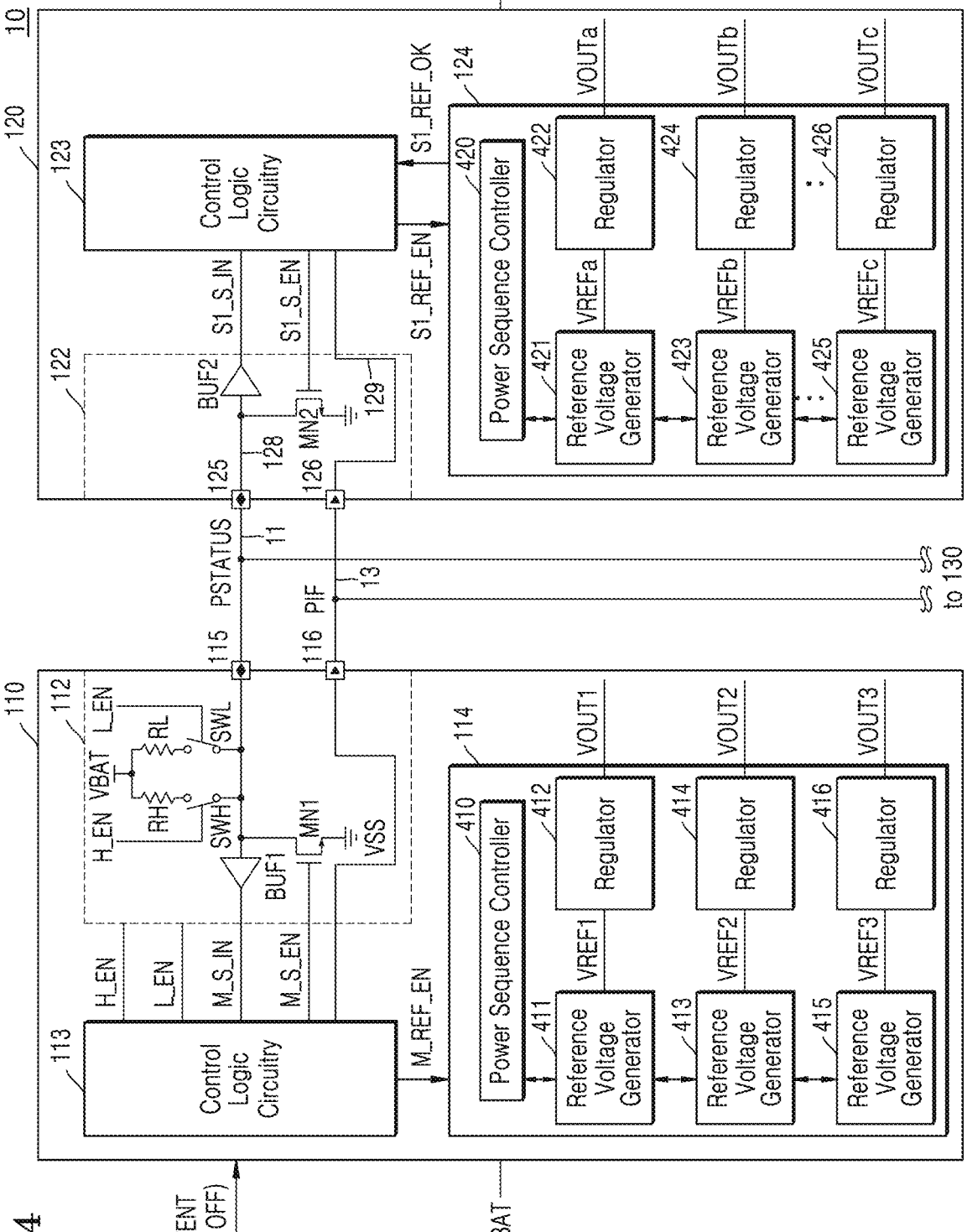
FIG. 4 is a block diagram of the PMIC system of FIG. 1 according to at least one example embodiment.

FIG. 4 is a block diagram of the PMIC system 100 of FIG. 1 according to at least one example embodiment. FIG. 4 shows in more detail a structure of the power converters 114 and 124 respectively included in the main PMIC 110 and the first sub-PMIC 120 of the PMIC system 100, but the example embodiments are not limited thereto.

Referring to FIG. 4, the power converters 114 and 124 may be configured to receive the battery power VBAT and respectively generate a plurality of output voltages VOUT1 to VOUT3 and VOUTa to VOUTc having various target levels, but the example embodiments are not limited thereto. The plurality of output voltages VOUT1 to VOUT3 and VOUTa to VOUTc of the plurality of power converters 114 and 124 may be provided to power domains of a plurality of IPs included in the AP 200 through the voltage rails 14 and 16, but the example embodiments are not limited thereto. The power converters 114 and 124 may include, e.g., buck regulators (or converters) configured to generate the output voltages VOUT1 to VOUT3 and VOUTa to VOUTc lower than the voltage level of the battery power VBAT based on the battery power VBAT, but the example embodiments are not limited thereto, and other types of power regulators or converters may be used. The power converters 114 and 124 are described by an example context of a buck regulator. One or more features of the disclosure may be utilized for other types of power converters, e.g., a boost regulator (or converter), a buck-boost regulator (or converter), and the like of which an output voltage is higher than a voltage of the battery power VBAT.

The power converter 114 of the main PMIC 110 may include a power sequence controller 410, a plurality of reference voltage generators 411, 413, and 415, and a plurality of regulators 412, 414, and 416, etc. The power converter 114 may operate in a ready state in response to a reference voltage enable signal M_REF_EN provided from the control logic circuitry 113. The power converter 114 may generate a plurality of desired output voltages VOUT1, VOUT2, and VOUT3 by stepping down the battery power VBAT. The reference voltage generators 411, 413, and 415 may be one-to-one connected to the regulators 412, 414, and 416, and first to third reference voltages VREF1, VREF2, and VREF3 generated by the reference voltage generators 411, 413, and 415 may be respectively provided to the regulators 412, 414, and 416, so that the output voltages VOUT1, VOUT2, and VOUT3 lower than the voltage level of the battery power VBAT may be generated, but the example embodiments are not limited thereto. The output voltages VOUT1, VOUT2, and VOUT3 of the power converter 114 may be provided to a plurality of power domains of the AP 200.

The power sequence controller 410 may control a power sequence for providing the plurality of output voltages VOUT1, VOUT2, and VOUT3 generated by the power converter 114 to the plurality of power domains. The power sequence indicates a power-up sequence (or a power-on sequence), a power-down sequence (or a power-off sequence), or the like. The power-up sequence indicates a sequence of the power domains in the AP 200, which transition from a power-down state to a power-up state, and the power-down sequence indicates a sequence of the power domains in the AP 200, which transition from the power-up state to the power-down state. According to at least one example embodiment of the inventive concepts, the power sequence may be controlled in a power domain unit or a power domain group unit, but is not limited thereto.

Like the power converter 114 of the main PMIC 110, the power converter 124 of the first sub-PMIC 120 may also include a power sequence controller 420, a plurality of reference voltage generators 421, 423, and 425, and a plurality of regulators 422, 424, and 426, but the example embodiments are not limited thereto. The power converter 124 may operate the reference voltage generators 421, 423, and 425 in the ready state in response to a reference voltage enable signal S1_REF_EN provided by the control logic circuitry 123. The power converter 124 may provide a reference voltage acknowledgement signal S1_REF_OK indicating the ready state of the reference voltage generators 421, 423, and 425 to the control logic circuitry 123. The power converter 124 may generate a plurality of desired output voltages VOUTa, VOUTb, and VOUTc by stepping down the battery power VBAT, but is not limited thereto. The power sequence controller 420 may control a power-on sequence or a power-off sequence for providing, in a power domain unit or a power domain group unit, the output voltages VOUTa, VOUTb, and VOUTc generated by the power converter 124 to the plurality of power domains in the AP 200 through the voltage rails 16, but is not limited thereto.

Figure 5:
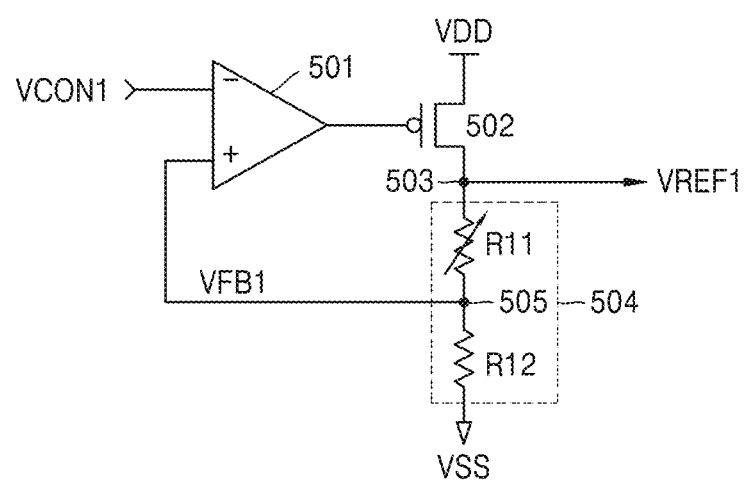
FIG. 5 is a circuit diagram of a reference voltage generator of FIG. 4 according to at least one example embodiment.

FIG. 5 is a circuit diagram of the reference voltage generator 411 of FIG. 4 according to at least one example embodiment.

Referring to FIG. 5, the reference voltage generator 411 may include an operational amplifier 501, a p-channel metal-oxide semiconductor (PMOS) transistor 502, and/or a feedbacker 504 including first and second resistors R11 and R12, etc., but the example embodiments are not limited thereto. The PMOS transistor 502 may include a source connected to a power source voltage (VDD) line, a drain connected to the first resistor R11, and/or a gate to which an output of the operational amplifier 501 is applied, etc., but the example embodiments are not limited thereto. The power source voltage VDD is a stable driving voltage derived from the battery power VBAT. The first and second resistors R11 and R12 of the feedbacker 504 are connected to a second node (505) line, the first resistor R11 is connected to a first node (503) line, and the second resistor R2 is connected to the ground voltage (VSS) line, etc. The first reference voltage VREF1 may be output to the first node (503) line to which the drain of the PMOS transistor 502 is connected, a feedback voltage VFB1 divided from the first reference voltage VREF1 at a ratio of the first and second resistors R11 and R12 may be provided to a positive (+) input terminal of the operational amplifier 501, and a first control voltage VCON1 may be provided to a negative (−) input terminal of the operational amplifier 501, but is not limited thereto. The first control voltage VCON1 may be provided by the control logic circuitry 113 in response to a command for designating a driving mode indicating a driving voltage level to be provided to a power domain of the AP 200, etc. The reference voltage generator 411 may generate the first reference voltage VREF1 following a voltage level of the first control voltage VCON1 based on the power source voltage VDD, but is not limited thereto.

Although a structure of the reference voltage generator 411 has been described with reference to FIG. 5, the other reference voltage generators 413, 415, 421, 423, and 425 may have substantially the same structure as the reference voltage generator 411, or may have a different structure than the reference voltage generator 411. However, control voltages of voltage levels different from the voltage level of the first control voltage VCON1 may be provided to the negative (−) input terminal of the operational amplifier 501 in the reference voltage generators 413, 415, 421, 423, and 425. The plurality of reference voltage generators 413, 415, 421, 423, and 425 may generate a plurality of reference voltages VREF2, VREF3, VREFa, VREFb, and VREFc following corresponding control voltage levels based on the power source voltage VDD, respectively, but are not limited thereto.

Figure 6A:
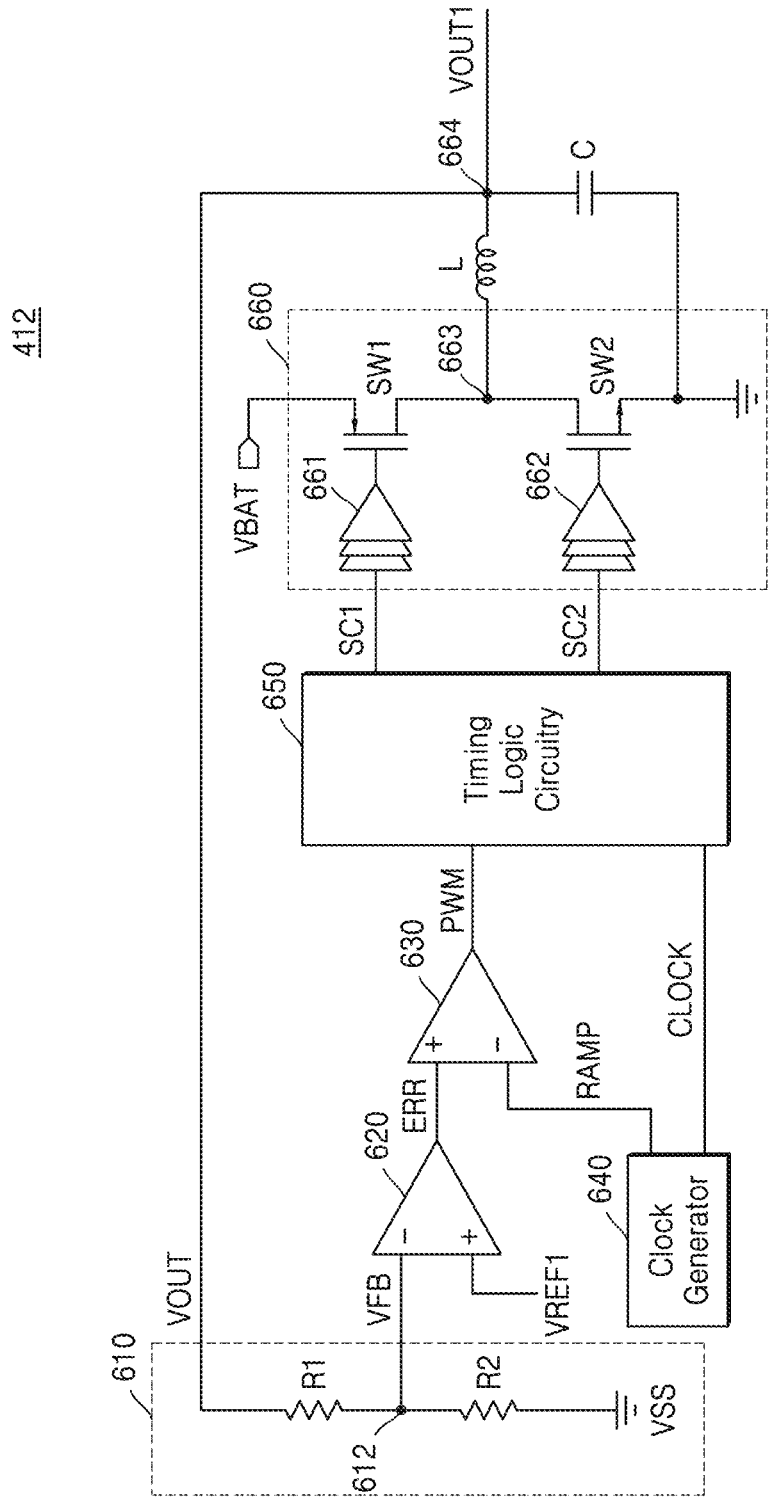
FIGS. 6A and 6B are a block diagram and a timing diagram of a first regulator of FIG. 4, respectively, according to at least one example embodiment.
Figure 6B:
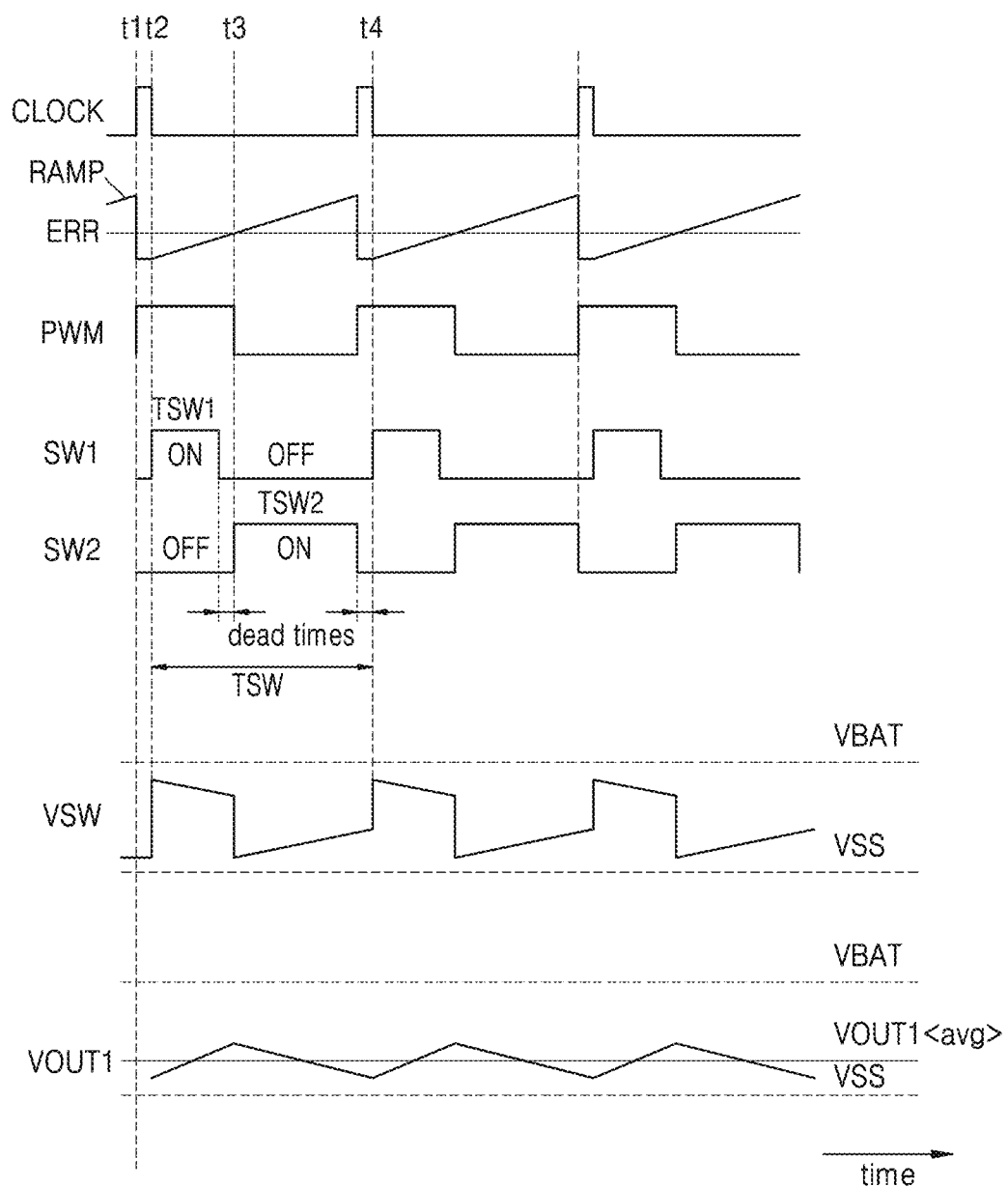

FIGS. 6A and 6B are a block diagram and a timing diagram of the regulator 412 of FIG. 4, respectively, according to some example embodiments. FIG. 6A is a block diagram of the regulator 412, such as a pulse width modulation (PWM) direct current (DC)-DC converter, etc., and FIG. 6B is a timing diagram of an operation of the regulator 412 of FIG. 6A, but the example embodiments are not limited thereto.

Referring to FIG. 6A, the regulator 412 may include a voltage divider 610, an error amplifier 620, a comparator 630, a clock generator 640, a timing logic 650 (e.g., timing logic circuitry, etc.), a switch block 660, an inductor L, and/or an output capacitor C, etc., but the example embodiments are not limited thereto. According to some example embodiments, the timing logic 650 may be any processing circuitry capable of controlling switches, such as hardware, logic circuits, processors, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), etc. As described below, the regulator 412 may be configured to change a duty cycle for turning on switches SW1 and SW2 of the switch block 660 so as to alternately connect and disconnect the inductor L to and from the battery power VBAT and configured to output the output voltage VOUT1 lower than the battery power VBAT according to the inductor L, which stores energy and discharges the energy, but the example embodiments are not limited thereto.

The voltage divider 610 may include for example, first and second resistors R1 and R2 connected in series between an output node (664) line and the ground voltage (VSS) line and output a feedback voltage VFB, but is not limited thereto. Resistance values of the first and second resistors R1 and R2 may be or may not be the same. The feedback voltage VFB is output to a node (612) line to which the first and second resistors R1 and R2 are connected and transmitted to an inverted input terminal (−) of the error amplifier 620, but the example embodiments are not limited thereto. The voltage divider 610 may provide the feedback voltage VFB that is proportionally low by dividing down the output voltage VOUT1, etc.

The error amplifier 620 may output an error signal ERR by amplifying a voltage difference between the feedback voltage VFB and the first reference voltage VREF1. The first reference voltage VREF1 may be generated by the reference voltage generator 411 (of FIG. 5) so as to have a certain and/or desired voltage level (e.g., a level of the first control voltage VCON1) and provided to a non-inverted input terminal (+) of the error amplifier 620, but the example embodiments are not limited thereto. For example, when the feedback voltage VFB is above the first reference voltage VREF1, a voltage level of the error signal ERR may decrease according to a voltage difference therebetween. When the feedback voltage VFB is below the first reference voltage VREF1, a voltage level of the error signal ERR may increase according to a voltage difference therebetween.

The comparator 630 may receive the error signal ERR by a non-inverted input terminal (+) thereof, and compare the error signal ERR with a ramp signal RAMP by an inverted input terminal (−) thereof, thereby generating a PWM signal. The ramp signal RAMP has a triangular waveform and may be provided from the clock generator 640, but the example embodiments are not limited thereto. When the error signal ERR is above the ramp signal RAMP, the comparator 630 may generate the PWM signal having a logic high state. When the error signal ERR is below the ramp signal RAMP, the PWM signal may have a logic low state. However, the example embodiments are not limited thereto.

The clock generator 640 may generate the ramp signal RAMP and a clock signal CLOCK to be provided to the timing logic circuitry 650, etc. According to at least one example embodiment of the inventive concepts, the clock generator 640 may randomly change a period (or a frequency) of the clock signal CLOCK according to a dynamic voltage frequency scaling (DVFS) policy provided from the AP 200, but is not limited thereto.

The timing logic circuitry 650 may receive the PWM signal and the clock signal CLOCK and provide series and shunt control signals SC1 and SC2 so that a series switch SW1 and a shunt switch SW2 of the switch block 660 exclusively function. That is, the timing logic circuitry 650 may turn off the shunt switch SW2 when the series switch SW1 is turned on, and turn on the shunt switch SW2 when the series switch SW1 is turned off. The timing logic circuitry 650 may control relative timing of the series and shunt switches SW1 and SW2 by using the series and shunt control signals SC1 and SC2.

The switch block 660 may include a plurality of driver amplifiers 661 and 662 and the plurality of series and shunt switches SW1 and SW2 connected in series between the battery power (VBAT) line and the ground voltage (VSS) line, but is not limited thereto. The inductor L may be connected between a switch node (663) line to which the series switch SW1 and the shunt switch SW2 are connected and an output node (664) line, and the output capacitor C may be connected between the output node (664) line and the ground voltage (VSS) line, but the example embodiments are not limited thereto.

The series and shunt switches SW1 and SW2 may be implemented by large (and/or relatively physically large) switching transistors, but the example embodiments are not limited thereto. The series and shunt control signals SC1 and SC2 provided from the timing logic circuitry 650 may be amplified before they are used to control the series and shunt switches SW1 and SW2. According to at least one example embodiment, the driver amplifiers 661 and 662 may include a cascade of inverters, each inverter may be larger than the inverters of a previous stage, and an inverter of the last stage may be designed to be sufficiently large so as to drive a capacitance of the series and shunt switches SW1 and SW2 of a several-millimeter size, but the example embodiments are not limited thereto.

During each switching cycle operation of a PWM operation, in a period in which the series switch SW1 is turned on and the shunt switch SW2 is turned off, power may be transmitted from the battery power VBAT to the switch node 663, and a current of the inductor L may increase, etc. In a period in which the series switch SW1 is turned off and the shunt switch SW2 is turned on, the current of the inductor L may decrease, etc. Through the PWM operation, energy built up in the inductor L may be charged to the output capacitor C to generate the output voltage VOUT1, but the example embodiments are not limited thereto.

Referring to FIG. 6B, according to at least one example embodiment, at a time point t1, the clock signal CLOCK goes to a high pulse, and the ramp signal RAMP may drop to a low level below a level (e.g., desired level and/or threshold level) of the error signal ERR. During the drop of the ramp signal RAMP, the level of the ramp signal RAMP may intersect with the level of the error signal ERR, and the PWM signal output from the comparator 630 may transition to the logic high state.

At a time point t2, the clock signal CLOCK transitions from high to low, and the ramp signal RAMP may start ramping up according to at least one example embodiment.

Approximately at the time point t2, the series switch may be turned on, and power may be transmitted from the battery power VBAT to the switch node 663 so that a voltage VSW of the switch node 663 goes to high, etc.

At a time point t3, the ramping ramp signal RAMP intersects with the level (e.g., desired level and/or threshold level) of the error signal ERR, and the PWM signal may transition from high to low. Approximately from the time point t3 to a time point 4, the shunt switch SW2 may be turned on, and the current of the inductor L may decrease, so that the voltage VSW of the switch node 663 goes to low, etc.

Herein, according to at least one example embodiment, during each switching cycle TSW of the PWM operation, a dead time may be interposed between a period TSW1 in which the series switch SW1 is turned on and a period TSW2 in which the shunt switch SW2 is turned on, so as not to simultaneously turn the series and shunt switches SW1 and SW2 on. The dead time may be set to decrease and/or prevent excessive power dissipation due to a current directly flowing from the battery power VBAT to the ground voltage VSS, and decrease and/or prevent possible reliability impairment, which may occur due to the excessive power dissipation.

According to switching cycles TSW of the PWM operation, the voltage VSW of the switch node (663) line, which repeatedly increases and decreases according to turn-on and turn-off states of the series and shunt switches SW1 and SW2, may be smoothed by the inductor L and the output capacitor C to output the output voltage VOUT1 having a target level. It may be configured that an average voltage value VOUT<avg> of the output voltage VOUT1 is output to be lower than the voltage level of the battery power VBAT and be the target level of the output voltage VOUT1, but the example embodiments are not limited thereto.

Although a structure and an operation of the regulator 412 have been described with reference to FIGS. 6A and 6B, the other regulators 414, 416, 422, 424, and 426 may also have the same structure and operation as the regulator 412, or may have different structures. However, in the regulators 414, 416, 422, 424, and 426, corresponding reference voltages VREF2, VREF3, VREFa, VREFb, and VREFc may be provided to the non-inverted input terminal (+) of the error amplifier 620, and output voltages VOUT2, VOUT3, VOUTa, VOUTb, and VOUTc may be output, respectively, according to at least one example embodiment, but the example embodiments are not limited thereto.

Figure 7:
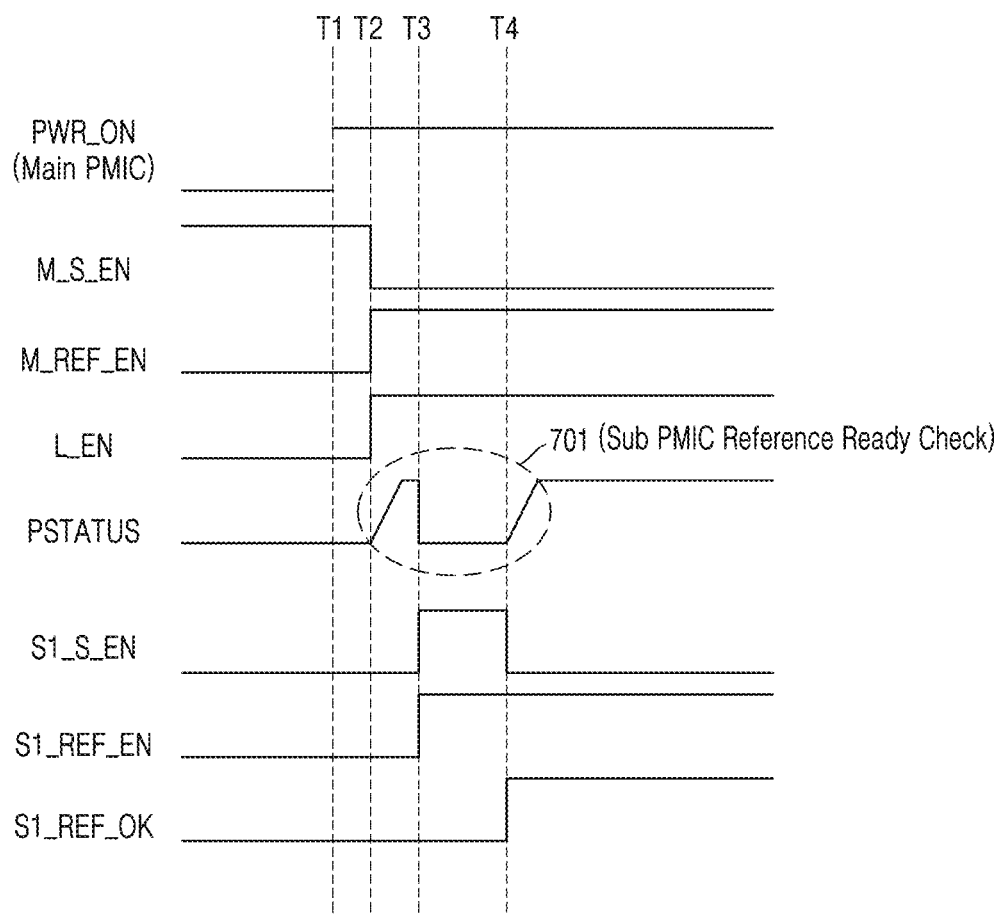
FIG. 7 is a diagram of a timing behavior of the PMIC system of FIG. 4 according to at least one example embodiment.

FIG. 7 is a diagram of a timing behavior of the PMIC system 100 of FIG. 4 according to at least one example embodiment. FIG. 7 shows a scheme of checking states of the reference voltage generators 421, 423, and 425 of the first sub-PMIC 120 before performing a power-on sequence of the PMIC system 100 in response to a power-on trigger of the main PMIC 110, but the example embodiments are not limited thereto.

Referring to FIGS. 4 and 7, before a time point T1, in the main PMIC 110, the third enable signal M_S_EN has the logic high level, and the reference voltage enable signal M_REF_EN and the second enable signal L_EN have the logic low level, but are not limited thereto. The NMOS transistor MN1 is turned on by the third enable signal M_S_EN of the logic high level, and thus, the power status signal PSTATUS has the logic low level. In the first sub-PMIC 120, the state enable signal S1_S_EN, the reference voltage enable signal S1_REF_EN, and the reference voltage acknowledgement signal S1_REF_OK have the logic low level. The power status signal PSTATUS is de-asserted to the logic low level.

At the time point T1, the main PMIC 110 may be triggered to be turned on.

At a time point T2, the main PMIC 110 may generate the third enable signal M_S_EN having the logic low level, and generate the reference voltage enable signal M_REF_EN and the second enable signal L_EN having the logic high level, but the example embodiments are not limited thereto. Power may be transmitted from the battery power VBAT to the first connection node (118) line through the second resistor RL and the second switch SWL by the second enable signal L_EN of the logic high level so that the first connection node (118) line goes to the logic high level. The logic high level of the first connection node (118) line is transmitted to the first pin 125 of the first sub-PMIC 120 through the power status signal (PSTATUS) line, etc.

At a time point T3, in the first sub-PMIC 120, the logic high level received by the first pin 125 may be output as the state input signal S1_S_IN through the buffer BUF2 and provided to the control logic circuitry 123, etc. The control logic circuitry 123 may generate the state enable signal S1_S_EN and the reference voltage enable signal S1_REF_EN at the logic high level based on the state input signal S1_S_IN having the logic high level. The NMOS transistor MN2 may be turned on by the state enable signal S1_S_EN having the logic high level so that the first connection node (128) line goes to the logic low level. The logic low level of the first connection node (128) line is transmitted to the power status signal (PSTATUS) line so that the power status signal (PSTATUS) line has the logic low level. The first sub-PMIC 120 may wait for the reference voltage acknowledgement signal S1_REF_OK, but is not limited thereto.

At a time point T4, in the first sub-PMIC 120, when the plurality of reference voltage generators 421, 423, and 425 are in the ready state in response to the reference voltage enable signal S1_REF_EN having the logic high level, the power converter 124 may generate the reference voltage acknowledgement signal S1_REF_OK having the logic high level and provide the generated reference voltage acknowledgement signal S1_REF_OK to the control logic circuitry 123. The control logic circuitry 123 may generate the state enable signal S1_S_EN having the logic low level based on the reference voltage acknowledgement signal S1_REF_OK having the logic high level. The NMOS transistor MN2 may be turned off based on the state enable signal S1_S_EN having the logic low level.

At the time point T4, the main PMIC 110 maintains the third enable signal M_S_EN of the logic low level and the second enable signal L_EN of the logic high level, but the example embodiments are not limited thereto. Accordingly, power may be transmitted from the battery power VBAT to the first connection node (118) line through the second resistor RL and the second switch SWL based on the second enable signal L_EN with the logic high level so that the first connection node (118) line goes to the logic high level. The logic high level of the first connection node (118) line is transmitted to the power status signal (PSTATUS) line, and the power status signal PSTATUS has the logic high level, but the example embodiments are not limited thereto.

As an operation result by the main PMIC 110 and the first sub-PMIC 120, an interface level 701 having a pulse signal with a ramping leading edge and a trailing edge and then triggered from the logic low level to the logic high level is shown on the power status signal (PSTATUS) line, but the example embodiments are not limited thereto. The interface level 701 of the power status signal PSTATUS is observed by (and/or detected by, received by, etc.) the main PMIC 110 and the first sub-PMIC 120 and may assert that the plurality of reference voltage generators 421, 423, and 425 of the first sub-PMIC 120 are in the ready state. Accordingly, the main PMIC 110 may confirm that the plurality of reference voltage generators 421, 423, and 425 of the first sub-PMIC 120 are in the ready state, by the interface level 701 of the power status signal PSTATUS. The main PMIC 110 may perform a power-on sequence after confirming that the plurality of reference voltage generators 421, 423, and 425 of the first sub-PMIC 120 are in the ready state. However, the example embodiments are not limited thereto.

Figure 8:
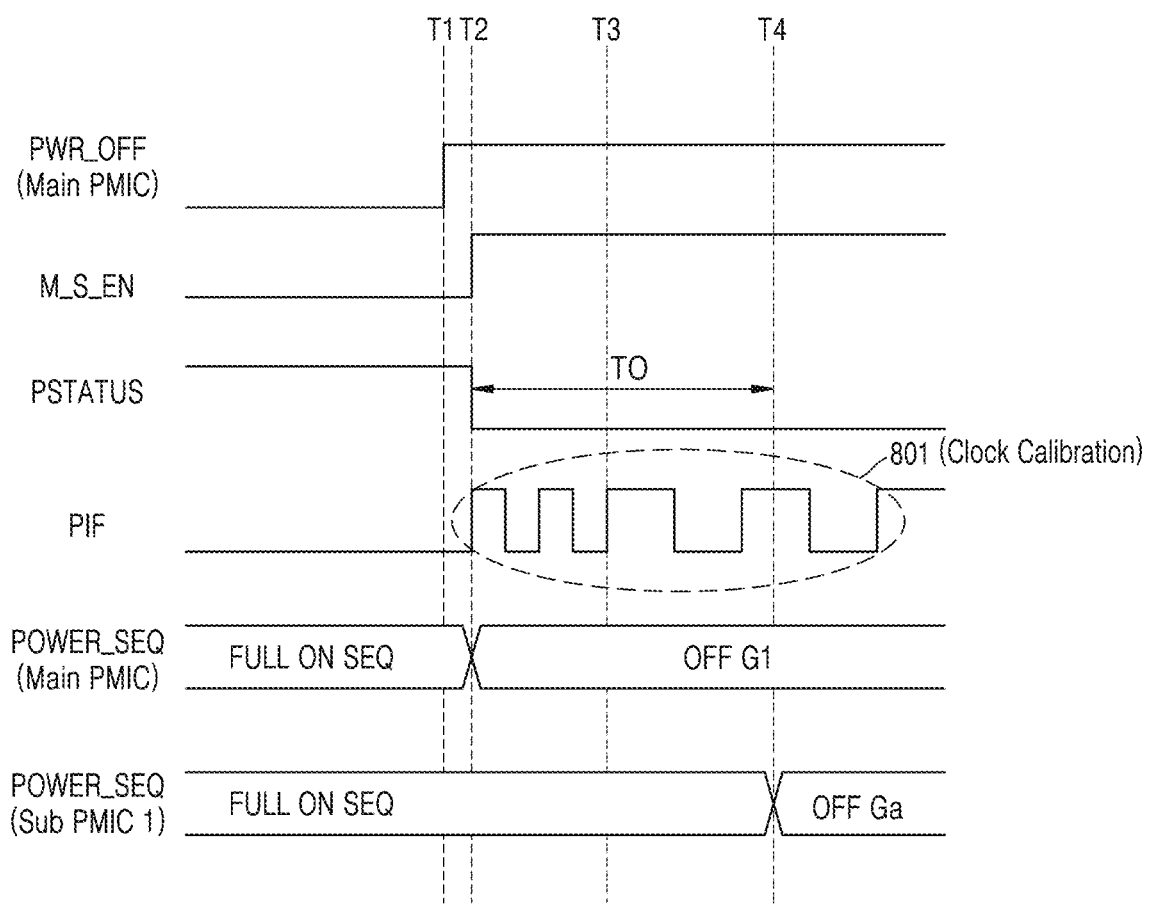
FIG. 8 is a timing diagram of a timing behavior of the PMIC system of FIG. 4 according to at least one example embodiment.

FIG. 8 is a timing diagram of a timing behavior of the PMIC system 100 of FIG. 4 according to at least one example embodiment. FIG. 8 shows a scheme of performing a power sequence of the PMIC system 100 in response to a power-off trigger of the main PMIC 110, but the example embodiments are not limited thereto.

Referring to FIGS. 4 and 8, before a time point T1, the PMIC system 100 is turned on, the power status signal PSTATUS has the logic high level, the main PMIC 110 and the first sub-PMIC 120 have completely finished a power-on sequence, and the power sequence control signal PIF is de-asserted to the logic low level, but the example embodiments are not limited thereto. In the main PMIC 110, the third enable signal M_S_EN has the logic low level.

At the time point T1, the main PMIC 110 may be triggered to power-off.

At a time point T2, the main PMIC 110 may generate the third enable signal M_S_EN having the logic high level, and the NMOS transistor MN1 may be turned on based on the third enable signal M_S_EN having the logic high level, so that the first connection node (118) line goes to the logic low level. The logic low level of the first connection node (118) line is transmitted to the first pin 125 of the first sub-PMIC 120 through the power status signal (PSTATUS) line, etc. The main PMIC 110 may perform a power-off sequence of the main PMIC 110 in response to the power-off trigger, but the example embodiments are not limited thereto. For example, the main PMIC 110 may control the power-off sequence to a power domain group G1 of the AP 200, etc.

From the time point T2 to a time point T3, the control logic circuitry 113 of the main PMIC 110 may generate a preamble signal indicating transmission of the power sequence control signal PIF, and provide the generated preamble signal to the second connection node (119) line. The preamble signal may be set to a bit code, e.g., "11", having a polarity change in the middle of a bit duration by using the bi-phase Manchester code scheme, but the example embodiments are not limited thereto. The preamble signal of the power sequence control signal PIF on the second connection node (119) line is transmitted to the second pin 126, the second connection node (129) line and the control logic circuitry 123 of the first sub-PMIC 120 through the power sequence control signal (PIF) line, etc. The first sub-PMIC 120 may wait for a power-off sequence.

At the time point T3, the main PMIC 110 may generate the power sequence control signal PIF toggled at every desired and/or certain time, and provide the generated power sequence control signal PIF to the first sub-PMIC 120. The power sequence control signal PIF may be set to be toggled at every certain time, e.g., 2 μs, etc., for clock calibration between the main PMIC 110 and the first sub-PMIC 120, but the example embodiments are not limited thereto.

A time point T4 indicates that a period in which the power status signal PSTATUS has the logic low level from the time point T2 is timed out for a particular time TO, e.g., 15 µs, but is not limited thereto. An interface level 801 of the power sequence control signal PIF signaled as a preamble signal and a signal toggled at every desired and/or certain time during the time-out time TO of the power status signal PSTATUS is shown on the power sequence control signal (PIF) line. The interface level 801 of the power sequence control signal PIF is observed by (and/or detected by, received by, etc.) the first sub-PMIC 120, and clock calibration of the first sub-PMIC 120 may be asserted. At the time point T4, the first sub-PMIC 120 may confirm the elapse (and/or expiration) of the time-out time period TO of the power status signal PSTATUS and control a power-off sequence to a power domain group Ga of the AP 200, but the example embodiments are not limited thereto.

Figure 9:
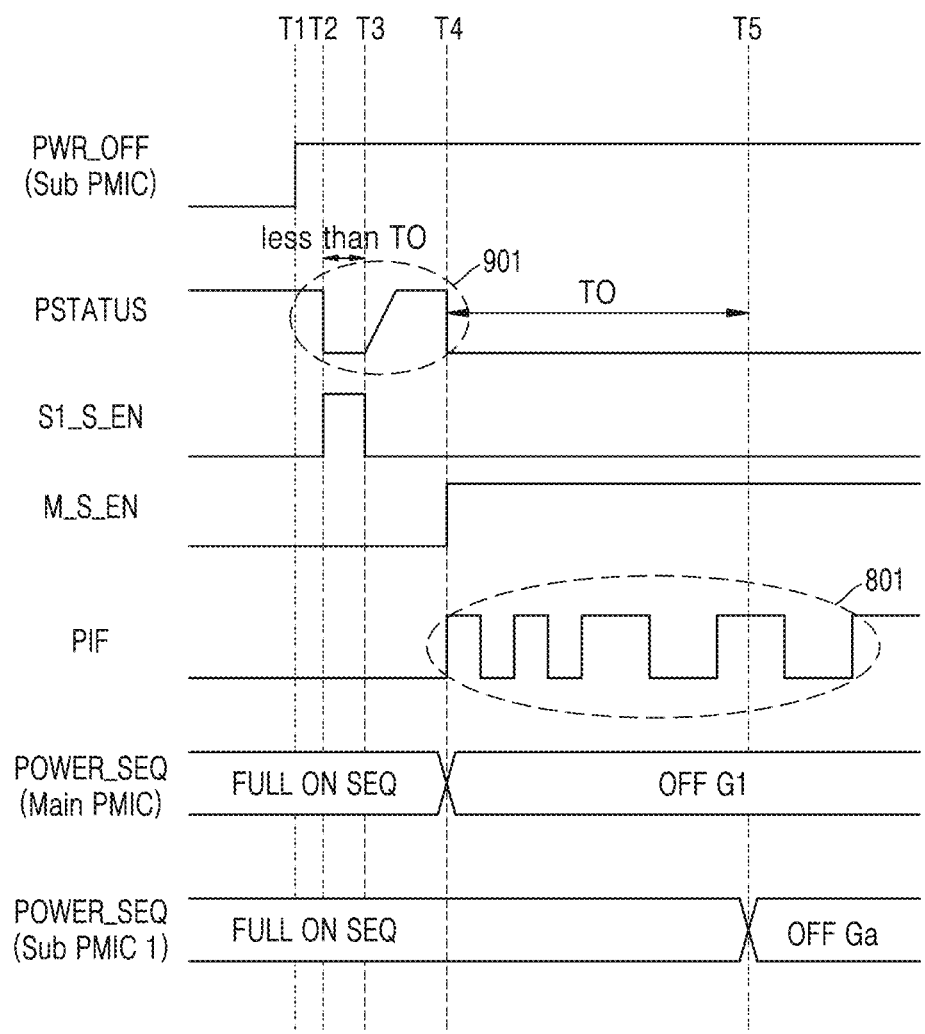
FIG. 9 is a diagram of a timing behavior of the PMIC system of FIG. 4 according to at least one example embodiment.

FIG. 9 is a diagram of a timing behavior of the PMIC system 100 of FIG. 4 according to at least one example embodiment. FIG. 9 shows a scheme of performing a power sequence of the PMIC system 100 in response to a power-off trigger of the first sub-PMIC 120, but the example embodiments are not limited thereto.

Referring to FIGS. 4 and 9, before a time point T1, the PMIC system 100 is turned on, the power status signal PSTATUS has the logic high level, the main PMIC 110 and the first sub-PMIC 120 have completely finished a power-on sequence, and the power sequence control signal PIF is de-asserted to the logic low level, but the example embodiments are not limited thereto. The third enable signal M_S_EN of the main PMIC 110 has the logic low level, and the state enable signal S1_S_EN of the first sub-PMIC 120 has the logic low level.

At the time point T1, the main PMIC 110 may be triggered to power-off.

At a time point T2, the first sub-PMIC 120 may generate the state enable signal S1_S_EN having the logic high level, and the NMOS transistor MN2 may be turned on based on the state enable signal S1_S_EN having the logic high level, so that the first connection node (128) line goes to the logic low level, but is not limited thereto. The logic low level of the first connection node (128) line is transmitted to the first pin 115 of the main PMIC 110 through the power status signal (PSTATUS) line. The power status signal PSTATUS has the logic low level.

A time point T3 is shorter than the power status signal PSTATUS having the logic low level starting at the time point T2 is timed out. In other words, the interval between the time points T2 and T3 may be set to a time less than the time-out time period TO, e.g., 15 µs, etc.

At the time point T3, the first sub-PMIC 120 may generate the state enable signal S1_S_EN of the logic low level. The main PMIC 110 maintains the power status signal PSTATUS of the logic high level. That is, in the main PMIC 110, power may be transmitted from the battery power VBAT to the first connection node (118) line through the second resistor RL and the second switch SWL by the second enable signal L_EN of the logic high level so that the first connection node (118) line and the power status signal (PSTATUS) line go to the logic high level, but the example embodiments are not limited thereto.

At a time point T4, in the main PMIC 110, the power status signal PSTATUS having a pulse signal with a trailing edge and a ramping leading edge during a time less than the time-out time TO, which is received through the first pin 115, is output as the state input signal M_S_IN through the buffer BUF1, and the state input signal M_S_IN may be provided to the control logic circuitry 113, but the example embodiments are not limited thereto. The control logic circuitry 113 may generate the third enable signal M_S_EN having the logic high level based on the state input signal M_S_IN. In the main PMIC 110, the NMOS transistor MN1 may be turned on by the third enable signal M_S_EN of the logic high level, so that the first connection node (118) line and the power status signal (PSTATUS) line go to the logic low level, but the example embodiments are not limited thereto.

Herein, as an operation result by the main PMIC 110 and the first sub-PMIC 120, an interface level 901 having a pulse signal with a trailing edge and a ramping leading edge for a time less than the time-out time period TO is shown on the power status signal (PSTATUS) line, but is not limited thereto. The interface level 901 of the power status signal PSTATUS is observed by (and/or detected, received by, etc.) the main PMIC 110 and the first and second sub-PMICs 120 and 130, and the main PMIC 110 may perform a power-off sequence based on the interface level 901 of the power status signal PSTATUS. For example, the main PMIC 110 may control a power-off sequence to the power domain group G1 of the AP 200, but is not limited thereto.

From the time point T4 to a time point T5, the main PMIC 110 may generate the power sequence control signal PIF as a preamble signal and a signal toggled at every desired and/or certain time during the time-out time TO of the power status signal PSTATUS, as described above with reference to FIG. 8. The interface level 901 of the power sequence control signal PIF is observed by (and/or detected by, received by, etc.) the first sub-PMIC 120, and clock calibration of the first sub-PMIC 120 may be asserted. At the time point T5, the first sub-PMIC 120 may confirm the elapse (and/or expiration) of the time-out time period TO of the power status signal PSTATUS and control a power-off sequence to the power domain group Ga of the AP 200, but the example embodiments are not limited thereto.

Figure 10:
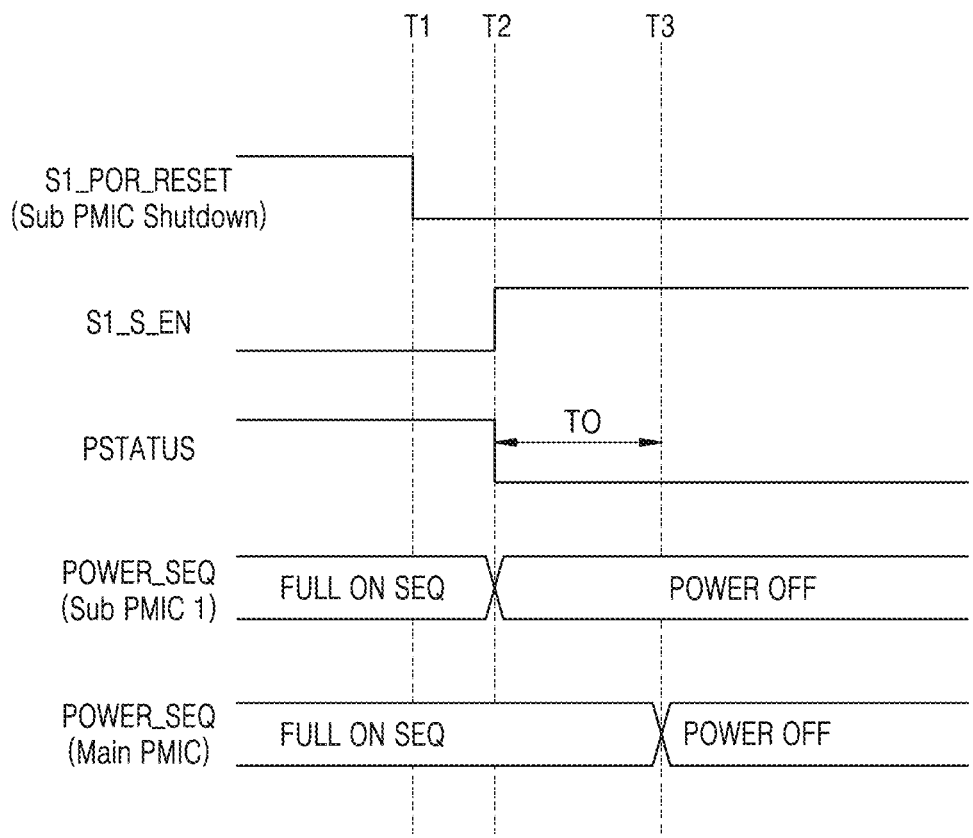
FIG. 10 is a diagram of a timing behavior of the PMIC system of FIG. 4 according to at least one example embodiment.

FIG. 10 is a diagram of a timing behavior of the PMIC system 100 of FIG. 4 according to at least one example embodiment. FIG. 10 shows a scheme of performing a power sequence of the PMIC system 100 in response to a shut-down event observed by (and/or detected by, received by, etc.) the first sub-PMIC 120, but the example embodiments are not limited thereto.

Referring to FIGS. 4 and 10, before a time point T1, the PMIC system 100 is turned on, the power status signal PSTATUS has the logic high level, and the main PMIC 110 and the first sub-PMIC 120 have completely finished a power-on sequence, but are not limited thereto. In the first sub-PMIC 120, the power on reset signal S1_POR_RESET has the logic high level.

At the time point T1, in the first sub-PMIC 120, the power on reset signal S1_POR_RESET may be triggered to the logic low level by a shut-down event, but is not limited thereto.

At a time point T2, the first sub-PMIC 120 may generate the state enable signal S1_S_EN having the logic high level, and the NMOS transistor MN2 may be turned on by the state enable signal S1_S_EN having the logic high level, so that the first connection node (128) line goes to the logic low level. The logic low level of the first connection node 128 is transmitted to the first pin 115 of the main PMIC 110 through the power status signal (PSTATUS) line. In addition, the first sub-PMIC 120 may be turned off in response to the power on reset signal S1_POR_RESET of the logic low level, but is not limited thereto.

A time point T3 indicates that the power status signal PSTATUS of the logic low level at the time point T2 elapses (and/or expired) the time-out time period TO. At the time point T3, the main PMIC 110 may confirm the elapse (and/or expiration) of the time-out time period TO of the power status signal PSTATUS and may be turned off.

Figure 11:
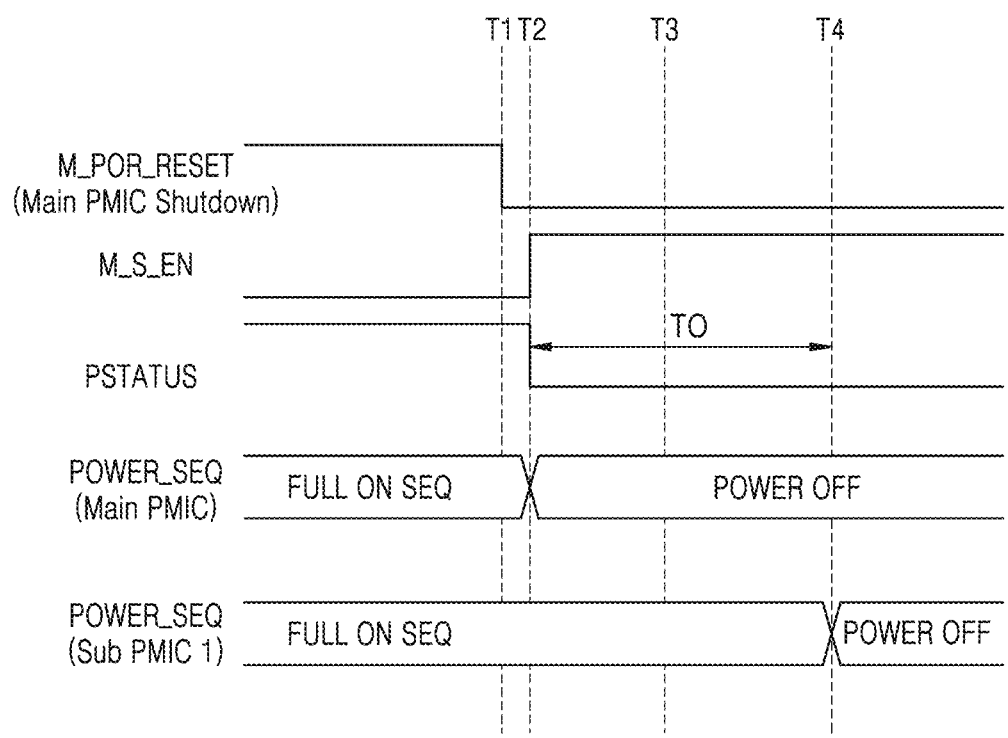
FIG. 11 is a diagram of a timing behavior of the PMIC system of FIG. 4 according to at least one example embodiment.

FIG. 11 is a diagram of a timing behavior of the PMIC system 100 of FIG. 4 according to at least one example embodiment. FIG. 11 shows a scheme of performing a power sequence of the PMIC system 100 in response to a shut-down event observed by (and/or detected by, received by, etc.) the main PMIC 110.

Referring to FIGS. 4 and 11, before a time point T1, the PMIC system 100 is turned on, the power status signal PSTATUS has the logic high level, and the main PMIC 110 and the first sub-PMIC 120 have completely finished a power-on sequence, but the example embodiments are not limited thereto. In the main PMIC 110, the power on reset signal M_POR_RESET has the logic high level.

At the time point T1, in the main PMIC 110, the power on reset signal M_POR_RESET may be triggered to the logic low level by a shut-down event.

At a time point T2, the main PMIC 110 may generate the third enable signal M_S_EN of the logic high level, and the NMOS transistor MN1 may be turned on based on the third enable signal M_S_EN having the logic high level, so that the first connection node (118) line goes to the logic low level. The logic low level of the first connection node 118 is transmitted to the first pin 125 of the first sub-PMIC 120 through the power status signal (PSTATUS) line. In addition, the main PMIC 110 may be turned off in response to the power on reset signal M_POR_RESET having the logic low level, but is not limited thereto.

A time point T3 indicates that the power status signal PSTATUS of the logic low level at the time point T2 elapses the time-out time period TO. At the time point T3, the first sub-PMIC 120 may confirm the elapse (and/or expiration) of the time-out time period TO of the power status signal PSTATUS and may be turned off.

FIGS. 12A to 12E are diagrams of inter-device signaling in a PMIC system, according to some example embodiments of the inventive concepts. FIGS. 12A to 12E show signaling associated with the power sequence control signal PIF of the PMIC system 100 of FIG. 1, but the example embodiments are not limited thereto.

Referring to FIG. 12A, the power sequence control signal PIF may be signaled by the bi-phase Manchester code scheme, but is not limited thereto. According to the bi-phase Manchester code scheme, a bit code is indicated as, e.g., "0", etc., when there is no polarity change in the middle of a bit duration bd, and as, e.g., "1", when there is a polarity change, but the example embodiments are not limited thereto.

Referring to FIG. 12B, the power sequence control signal PIF may assert ID check of the first and second sub-PMICs 120 and 130 in the PMIC system 100. The power sequence control signal PIF may include at least two preamble bits, one start bit, three chip ID bits, one parity bit, and one stop bit. In at least one example embodiment, particular chip ID bits of one of the first and second sub-PMICs 120 and 130 may be, e.g., "000", and the parity bit may be an odd parity, etc.

Referring to FIG. 12C, the power sequence control signal PIF may assert start of a power-on sequence. The power sequence control signal PIF may include two preamble bits, one start bit, three power-on sequence command bits, one parity bit, and one stop bit, etc., but are not limited thereto.

In at least one example embodiment, particular power-on sequence command bits may be, e.g., "111", and the parity bit may be an odd parity, etc.

Referring to FIG. 12D, the power sequence control signal PIF may assert clock synchronization (or calibration) of the PMIC system 100. The power sequence control signal PIF may be signaled as a two-bit preamble signal and a signal toggled at every desired and/or certain time, but the example embodiments are not limited thereto.

Referring to FIG. 12E, the power sequence control signal PIF may assert a trigger point of a power-on and/or power-off sequence of the PMIC system 100. The power sequence control signal PIF may be frequency-shifted by using frequency shift keying, but the example embodiments are not limited thereto, and other keying schemes may be used. Recognition of a frequency shift time point 1201 of the power sequence control signal PIF may be dominant to (and/or cause) a counting operation by a counter. By sequentially performing a power-on or power-off sequence in the PMIC system 100 in a power domain unit or power domain group unit of the AP 200, the plurality of output voltages VOUT1, VOUT2, VOUT3, VOUTa, VOUTb, and VOUTc, etc., output from the main PMIC 110 and the first sub-PMIC 120 are generated according to the power-on or power-off sequence. In this case, a generation order of the plurality of output voltages VOUT1, VOUT2, VOUT3, VOUTa, VOUTb, and VOUTc, etc., may be set in correspondence to (and/or based on) an order corresponding to a counting value. Accordingly, the frequency shift time point 1201 of the power sequence control signal PIF may indicate a trigger point of the power-on or power-off sequence.

Figure 13:
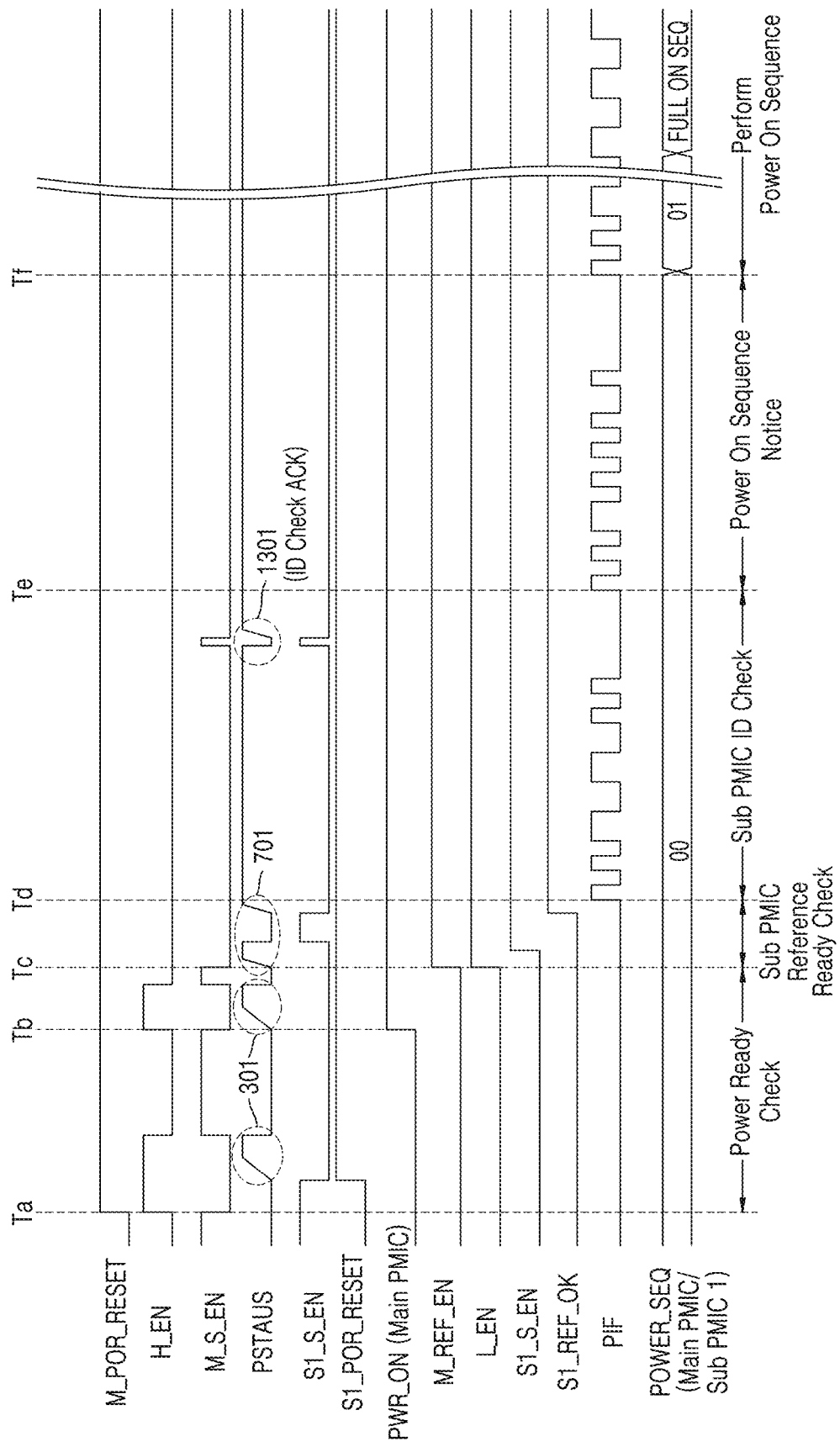
FIG. 13 is a timing diagram of a power-on sequence performed by a PMIC system, according to at least one example embodiment of the inventive concepts.

FIG. 13 is a timing diagram of a power-on sequence performed by the PMIC system 100 through inter-device signaling, according to at least one example embodiment of the inventive concepts.

Referring to FIG. 13, between a time point Ta and a time point Tb, the PMIC system 100 may perform an operation of checking the power ready state of the main PMIC 110 and the first sub-PMIC 120, which has been described with reference to FIG. 3, but the example embodiments are not limited thereto. Between the time point Tb and a time point Tc, the main PMIC 110 may perform, once more, an operation of checking the power ready state of the first sub-PMIC 120, but the example embodiments are not limited thereto. Accordingly, the interface level 301 of the power status signal PSTATUS is observed by (and/or detected by, received by, etc.) the main PMIC 110 and the first sub-PMIC 120, and it may be asserted to the main PMIC 110 that the first sub-PMIC 120 is in the power ready state.

Between the time point Tc and a time point Td, the PMIC system 100 may perform an operation of checking states of the plurality of reference voltage generators 421, 423, and 425 of the first sub-PMIC 120 before performing a power-on sequence of the PMIC system in response to a power-on trigger of the main PMIC 110, which has been described with reference to FIG. 7. Accordingly, the interface level 701 of the power status signal PSTATUS is observed by (and/or detected by, received by, etc.) the main PMIC 110 and the first sub-PMIC 120, and it may be asserted to the main PMIC 110 that the plurality of reference voltage generators 421, 423, and 425 of the first sub-PMIC 120 are in the ready state.

Between the time point Td and a time point Te, the PMIC system 100 may assert ID check of the first sub-PMIC 120 to the main PMIC 110, which has been described with reference to FIG. 12B, and the main PMIC 110 may respond to the ID check of the first sub-PMIC 120 by using an interface level 1301 of the power status signal PSTATUS.

Between the time point Te and a time point Tf, the PMIC system 100 may assert start of a power-on sequence by using the power sequence control signal PIF, which has been described with reference to FIG. 12C.

At the time point Tf, the PMIC system 100 may perform a power-on sequence in which the power converters 114 and 124 of the main PMIC 110 and the first sub-PMIC 120 generate the plurality of output voltages VOUT1, VOUT2, VOUT3, VOUTa, VOUTb, and VOUTc, etc. The PMIC system 100 may control the power-on sequence in a power domain unit or a power domain group unit of the AP 200, but is not limited thereto.

Figure 14:
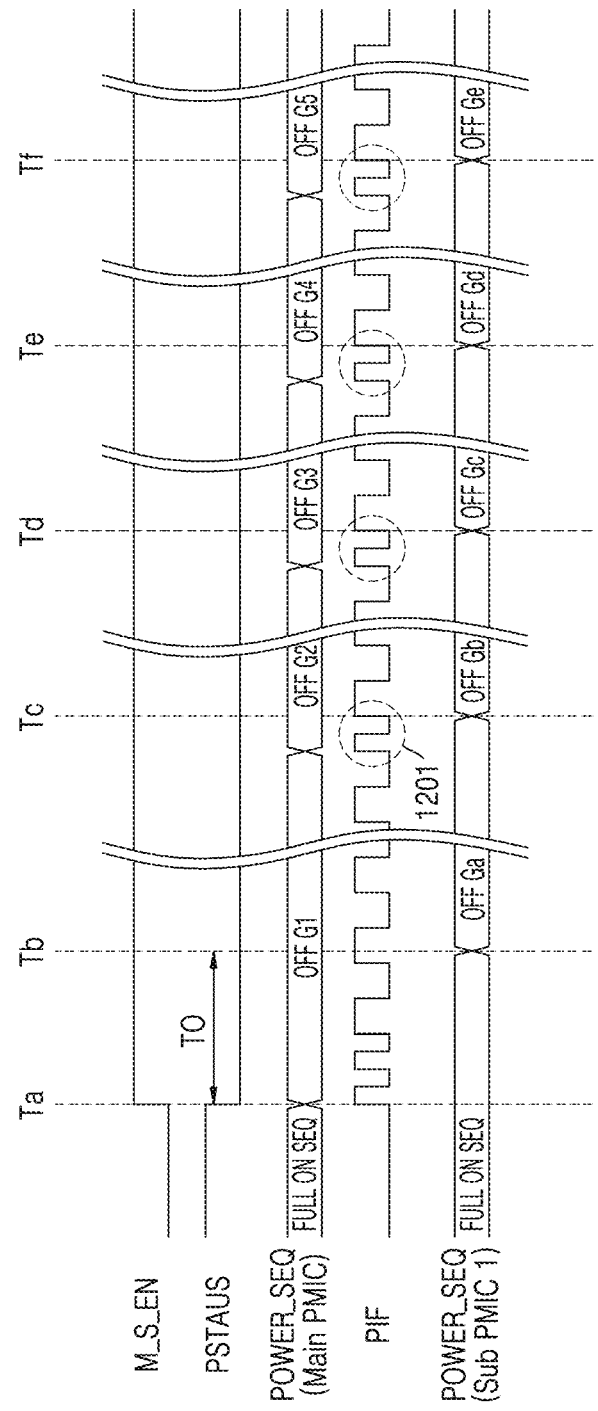
FIG. 14 is a timing diagram of a power-off sequence performed by a PMIC system, according to at least one example embodiment of the inventive concepts.

FIG. 14 is a timing diagram of a power-off sequence performed by the PMIC system 100 through inter-device signaling, according to at least one example embodiment of the inventive concepts. The PMIC system 100 in FIG. 14 may perform an operation of performing a power sequence of the PMIC system 100 in response to a power-off trigger of the main PMIC 110, which has been described with reference to FIG. 8, but the example embodiments are not limited thereto.

Referring to FIG. 14, at a time point Ta, the main PMIC 110 is triggered to power-off and may perform a power-off sequence of blocking power supply in a sequential order of power domain groups G2, G3, G4, G5, and G6 by starting from the power domain group G1 of the AP 200 in response to the power-off trigger, but the example embodiments are not limited thereto, and for example, other orders for performing the power-off sequence may be used and/or the power domain groups may be powered off simultaneously, randomly, etc.

Between the time point Ta and a time point Tb, the main PMIC 110 may assert clock synchronization (or calibration) to the first sub-PMIC 120 by using the power sequence control signal PIF signaled as a preamble signal and a signal toggled at every desired and/or certain time during the time-out time TO of the power status signal PSTATUS.

At the time point Tb, the first sub-PMIC 120 may receive the power sequence control signal PIF and confirm elapse (and/or expiration) of the time-out time period TO of the power status signal PSTATUS, thereby blocking power supply to the power domain group Ga of the AP 200.

At a time point Tc, the PMIC system 100 may assert a power-off sequence trigger point of the first sub-PMIC 120 by using the frequency shift time point 1201 of the power sequence control signal PIF, which has been described with reference to FIG. 12E, but the example embodiments are not limited thereto. The first sub-PMIC 120 may block power supply to a power domain group Gb of the AP 200 in response to the power-off sequence trigger point of the power sequence control signal PIF. In the same manner as described above, at time points Td, Te, and Tf, the first sub-PMIC 120 may block power supply in an order of power domain groups Gc, Gd, and Ge of the AP 200 in response to power-off sequence trigger points of the power sequence control signal PIF.

While various example embodiments of the inventive concepts have been particularly shown and described with reference to example embodiments thereof, it will be understood that various changes in form and details may be made therein without departing from the spirit and scope of the following claims.

What is claimed is:

1. A method of signaling between multiple power management integrated circuits (PMICs), the method comprising:

coupling a main PMIC and at least one sub-PMIC to each other through a first bidirectional line;

coupling the main PMIC to the at least one sub-PMIC to each other through a second unidirectional line;

asserting an operation associated with a power sequence of the main PMIC and the at least one sub-PMIC based on a power status signal on the first bidirectional line from the main PMIC and the at least one sub-PMIC; and asserting an operation of controlling a power sequence of the at least one sub-PMIC by using a power sequence control signal on the second unidirectional line from the main PMIC to the at least one sub-PMIC.

2. The method of claim 1, further comprising:

triggering a power on reset signal in the main PMIC in response to a voltage level of external power provided to the main PMIC being maintained at a desired level;

generating, by the main PMIC and the at least one sub-PMIC, the power status signal as a pulse signal with a ramping leading edge and a trailing edge as an operation result in response to the power on reset signal; and confirming, by the main PMIC, a power ready state of the multiple PMICs based on the power status signal.

3. The method of claim 1, further comprising:

triggering the main PMIC to power-on;

generating, by the main PMIC and the at least one sub-PMIC, the power status signal as a pulse signal with a ramping leading edge and a trailing edge and then transitioning from a logic low level to a logic high level as an operation result in response to the power-on trigger; and confirming, by the main PMIC, a ready state of a plurality of reference voltage generators of the at least one sub-PMIC based on the power status signal.

4. The method of claim 1, further comprising:

triggering the main PMIC to power-off;

performing, by the main PMIC, a power-off sequence of the main PMIC in response to the power-off trigger, the power-off sequence including, generating the power status signal to be a logic low level, generating the power sequence control signal as a preamble signal and a signal toggled at desired times during a time-out time period of a logic low level duration of the power status signal; and performing, by the at least one sub-PMIC, clock synchronization of the at least one sub-PMIC in response to the power sequence control signal, the clock synchronization including confirming an expiration of the time-out time period of the power status signal, and performing a power-off sequence of the at least one sub-PMIC.

5. The method of claim 1, further comprising:

triggering the at least one sub-PMIC to power-off;

generating the power status signal as a pulse signal with a trailing edge and a ramping leading edge for a time less than a time-out time period as an operation result by the main PMIC and the at least one sub-PMIC in response to the power-off trigger;

performing, by the main PMIC, a power-off sequence of the main PMIC, the performing the power-off sequence of the main PMIC including, generating the power status signal to be a logic low level, which has a pulse signal with a trailing edge and a ramping leading edge for a time less than the time-out time period, and generating the power sequence control signal as a preamble signal and a signal toggled at desired times during the time-out time period of a logic low level duration of the power status signal; and performing, by the at least one sub-PMIC, clock synchronization of the at least one sub-PMIC in response to the power sequence control signal, the clock synchronization including, confirming expiration of the time-out time period of the power status signal, and performing a power-off sequence of the at least one sub-PMIC.

6. The method of claim 1, further comprising:

observing a shut-down event in the at least one sub-PMIC;

turning off, by the at least one sub-PMIC, the at least one sub-PMIC in response to the shut-down event, the turning off the at least one sub-PMIC including generating the power status signal to be a logic low level; and confirming, by the main PMIC, expiration of a time-out time period of a low logic level duration of the power status signal, the confirming including turning off the main PMIC.

7. The method of claim 1, further comprising:

observing a shut-down event in the main PMIC;

turning off, by the main PMIC, the main PMIC in response to the shut-down event, the turning off the main PMIC including generating the power status signal to be a logic low level; and confirming, by the at least one sub-PMIC, expiration of a time-out time period of a low logic level duration of the power status signal, the confirming including turning off the at least one sub-PMIC.

8. The method of claim 1, wherein the power sequence control signal is signaled based on a bi-phase Manchester code scheme.

9. The method of claim 1, wherein the power sequence control signal includes a plurality of preamble bits, a start bit, a plurality of chip identification (ID) bits, a parity bit and a stop bit, and causes an ID check to be performed by the main PMIC of the at least one sub-PMIC.

10. The method of claim 1, wherein the power sequence control signal includes a plurality of preamble bits, a start bit, a plurality of power-on sequence command bits, a parity bit, and a stop bit, and causes start of a power-on sequence by the main PMIC.

11. The method of claim 1, further comprising:

generating, by the main PMIC, the power sequence control signal by generating a frequency shift time point using frequency shift keying, the frequency shift time point indicating a trigger point of a power-on or power-off sequence of the at least one sub-PMIC.

* * * * *